(12) United States Patent
Drzymala et al.

(10) Patent No.: US 11,126,809 B2
(45) Date of Patent: Sep. 21, 2021

(54) BIOPTIC BARCODE READERS

(71) Applicant: ZEBRA TECHNOLOGIES CORPORATION, Lincolnshire, IL (US)

(72) Inventors: Mark Drzymala, Saint James, NY (US); Edward Barkan, Miller Place, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 11 days.

(21) Appl. No.: 16/678,773

(22) Filed: Nov. 8, 2019

(65) Prior Publication Data
US 2021/0142015 A1 May 13, 2021

(51) Int. Cl.
*G06K 7/10* (2006.01)
*G06K 7/14* (2006.01)

(52) U.S. Cl.
CPC ....... *G06K 7/10722* (2013.01); *G06K 7/1413* (2013.01)

(58) Field of Classification Search
CPC .............. G06K 7/1096; G06K 7/1404; G06K 2007/10485
USPC ................................................... 235/462.41
See application file for complete search history.

(56) References Cited

U.S. PATENT DOCUMENTS

| | | | |
|---|---|---|---|
| 2006/0043194 A1* | 3/2006 | Barkan | G06K 7/10722 235/462.45 |
| 2010/0102129 A1* | 4/2010 | Drzymala | G06K 7/10712 235/462.42 |
| 2011/0168780 A1 | 7/2011 | McQueen et al. | |
| 2013/0181051 A1 | 7/2013 | Olmstead et al. | |
| 2013/0328682 A1* | 12/2013 | Shearin | G06K 7/1096 340/572.3 |
| 2018/0121694 A1 | 5/2018 | Gao et al. | |
| 2019/0188434 A1 | 6/2019 | Drzymala et al. | |

OTHER PUBLICATIONS

International Search Report and Written Opinion for International Application No. PCT/US2020/051996 dated Dec. 14, 2020.

* cited by examiner

*Primary Examiner* — Toan C Ly
(74) *Attorney, Agent, or Firm* — Yuri Astvatsaturov

(57) ABSTRACT

A bioptic barcode reader has a housing having a lower housing portion with an upper surface and an upper housing portion extending above the lower housing portion. A generally horizontal window is positioned at the upper surface, a generally upright window is positioned in the upper housing portion, and an imaging assembly having a primary field-of-view and a set of optical components are positioned within the interior region. The housing has a width greater than or equal to 5 inches and less than or equal to 7 inches, the lower housing portion has a height greater than or equal to 3 inches, the upper housing portion has a height greater than or equal to 4 inches and less than or equal to 6 inches, and the upper surface has a length greater than or equal to 6 inches and less than or equal to 8 inches.

22 Claims, 14 Drawing Sheets

BIOPTIC BARCODE READERS

FIELD OF THE DISCLOSURE

At least some embodiment of the present invention generally relate to bioptic barcode readers and, in particular, to compact barcode readers.

BACKGROUND

Bioptic barcode readers have traditionally been relatively expensive due to their size and need of support for a scale. Therefore, there is a need for compact, low cost bioptic barcode readers that can be used at various retail locations, such as self-checkout kiosks or other high throughput retail type areas.

SUMMARY

In an embodiment, the present invention is a bioptic barcode reader having a product scanning region, a housing having a lower housing portion with an upper surface facing the product scanning region, an upper housing portion extending above the lower housing portion, and an imaging assembly having a primary field-of-view. A generally horizontal window is positioned at the upper surface of the lower housing portion and is configured to allow a first light to pass between the product scanning region and an interior region of the housing and a generally upright window is positioned in the upper housing portion and is configured to allow a second light to pass between the product scanning region and the interior region of the housing. A set of optical components is positioned within the interior region of the housing and is configured to divide the primary field-of-view of the imaging assembly. The housing has a width that is greater than or equal to 5 inches and less than or equal to 7 inches, the lower housing portion has a height that is greater than or equal to 3 inches, the upper housing portion has a height that is greater than or equal to 4 inches and less than or equal to 6 inches and the upper surface of the lower housing portion has a length between a proximal edge adjacent the upper housing portion to a distal edge, opposite the proximal edge, that is greater than or equal to 6 inches and less than or equal to 8 inches.

In another embodiment, the present invention is a bioptic barcode reader having a product scanning region, a housing having a lower housing portion with an upper surface facing the product scanning region, and an upper housing portion extending above the lower housing portion, the upper surface having a proximal edge adjacent the upper portion and a distal edge opposite the proximal edge. An imaging assembly has a primary field-of-view and includes a printed circuit board with a single image sensor. The printed circuit board is aligned generally perpendicular to the upper surface and the printed circuit board and the image sensor arranged to direct the primary field-of-view generally parallel to the upper surface and towards the distal edge of the upper surface. A decode module is communicatively coupled to the imaging assembly and is configured to decode a barcode captured in an image by the imaging assembly. A generally horizontal window is positioned at the upper surface of the lower housing portion and is configured to allow a first light to pass between the product scanning region and an interior region of the housing and a generally upright window positioned in the upper housing portion and is configured to allow a second light to pass between the product scanning region and the interior region of the housing. A mirror arrangement is positioned within the interior region and includes a splitter mirror, a first mirror, and a second mirror. The splitter mirror is positioned directly in a first path of a first portion of the primary field-of-view and is configured to split the primary field-of-view along a horizontal axis and redirect the first portion of the primary field-of-view from the first path to a second path towards the second mirror. The first mirror is positioned directly in a third path of a second portion of the primary field-of-view and is configured to redirect the second portion through the generally horizontal window. The second mirror is positioned directly in the second path and is configured to redirect the first portion through the generally upright window. The bioptic barcode reader has no other imaging assembly communicatively coupled to the decode module and used to process images for decoding indicia.

In yet another embodiment, the present invention is a bioptic barcode reader having a product scanning region, a housing having a lower housing portion with an upper surface facing the product scanning region, and an upper housing portion extending above the lower housing portion, the upper surface having a proximal edge adjacent the upper portion and a distal edge opposite the proximal edge. An imaging assembly has a primary field-of-view and includes a printed circuit board with a single image sensor. The printed circuit board is aligned generally perpendicular to the upper surface and the printed circuit board and the image sensor arranged to direct the primary field-of-view generally parallel to the upper surface and towards the distal edge of the upper surface. A decode module is communicatively coupled to the imaging assembly and is configured to decode a barcode captured in an image by the imaging assembly. A generally horizontal window is positioned at the upper surface of the lower housing portion and is configured to allow a first light to pass between the product scanning region and an interior region of the housing and a generally upright window is positioned in the upper housing portion and is configured to allow a second light to pass between the product scanning region and the interior region of the housing. A mirror arrangement is positioned within the interior region and includes a splitter mirror, a first mirror, a second mirror, and a third mirror. The splitter mirror is positioned directly in a first path of a first portion of the primary field-of-view and is configured to: split the primary field-of-view along a horizontal axis; split the first portion of the primary field-of-view into a first subfield and a second subfield; redirect the first subfield along a second path towards the second mirror; and redirect the second subfield along a third path towards the third mirror. The first mirror is positioned directly in a fourth path of a second portion of the primary field-of-view and is configured to redirect the second portion through the generally horizontal window. The second mirror is positioned directly in the second path and is configured to redirect the first subfield through the generally upright window. The third mirror is positioned directly in the third path and is configured to redirect the second subfield through the generally upright window. The bioptic barcode reader has no other imaging assembly communicatively coupled to the decode module and used to process images for decoding indicia.

In still yet another embodiment, the present invention is a bioptic barcode reader having a product scanning region, a housing having a lower housing portion with an upper surface facing the product scanning region, and an upper housing portion extending above the lower housing portion, the upper surface having a proximal edge adjacent the upper portion and a distal edge opposite the proximal edge. An imaging assembly has a primary field-of-view and includes a printed circuit board with a single image sensor. The printed circuit board is aligned generally horizontal to the upper surface and the printed circuit board and the image sensor arranged to direct the primary field-of-view generally perpendicular to the upper surface and towards the upper housing portion. A decode module is communicatively coupled to the imaging assembly and is configured to decode a barcode captured in an image by the imaging assembly. A generally horizontal window is positioned at the upper surface of the lower housing portion and is configured to allow a first light to pass between the product scanning region and an interior region of the housing and a generally upright window is positioned in the upper housing portion and is configured to allow a second light to pass between the product scanning region and the interior region of the housing. A mirror arrangement is positioned within the interior region and includes a splitter mirror, a first mirror, and a second mirror. The splitter mirror is positioned directly in a first path of a first portion of the primary field-of-view and is configured to split the primary field-of-view along a horizontal axis and redirect the first portion of the primary field-of-view from the first path to a second path towards the first mirror. The second mirror is positioned directly in a third path of a second portion of the primary field-of-view and is configured to redirect the second portion through the generally upright window. The first mirror is positioned directly in the second path and is configured to redirect the first portion through the generally horizontal window. The bioptic barcode reader has no other imaging assembly communicatively coupled to the decode module and used to process images for decoding indicia.

In still yet another embodiment, the present invention is a bioptic barcode reader having a product scanning region, a housing having a lower housing portion with an upper surface facing the product scanning region, and an upper housing portion extending above the lower housing portion, the upper surface having a proximal edge adjacent the upper portion and a distal edge opposite the proximal edge. An imaging assembly has a primary field-of-view and includes a printed circuit board with a single image sensor. The printed circuit board is aligned generally horizontal to the upper surface and the printed circuit board and the image sensor are arranged to direct the primary field-of-view generally perpendicular to the upper surface and towards the upper housing portion. A decode module is communicatively coupled to the imaging assembly and is configured to decode a barcode captured in an image by the imaging assembly. A generally horizontal window is positioned at the upper surface of the lower housing portion and is configured to allow a first light to pass between the product scanning region and an interior region of the housing and a generally upright window is positioned in the upper housing portion and is configured to allow a second light to pass between the product scanning region and the interior region of the housing. A mirror arrangement is positioned within the interior region and includes a splitter mirror, a first mirror, a second mirror, and a third mirror. The splitter mirror is positioned directly in a first path of a first portion of the primary field-of-view and is configured to: split the primary field-of-view along a horizontal axis; split the first portion of the primary field-of-view into a first subfield and a second subfield; redirect the first subfield along a second path towards the second mirror; and redirect the second subfield along a third path towards the third mirror. The first mirror is positioned directly in a fourth path of a second portion of the primary field-of-view and is configured to redirect the second portion through the generally upright window. The second mirror is positioned directly in the second path and is configured to redirect the first subfield through the generally horizontal window. The third mirror is positioned directly in the third path and is configured to redirect the second subfield through the generally horizontal window. The bioptic barcode reader has no other imaging assembly communicatively coupled to the decode module and used to process images for decoding indicia.

In still yet another embodiment, the present invention is a bioptic barcode reader having a product scanning region, a housing having a lower housing portion with an upper surface facing the product scanning region, and an upper housing portion extending above the lower housing portion, the upper surface having a proximal edge adjacent the upper portion and a distal edge opposite the proximal edge. An imaging assembly has a primary field-of-view and includes a printed circuit board with a single image sensor. The printed circuit board is aligned generally perpendicular to the upper surface and the printed circuit board and the image sensor arranged to direct the primary field-of-view generally parallel to the proximal edge of the upper surface. A decode module is communicatively coupled to the imaging assembly and is configured to decode a barcode captured in an image by the imaging assembly. A generally horizontal window is positioned at the upper surface of the lower housing portion and is configured to allow a first light to pass between the product scanning region and an interior region of the housing and a generally upright window is positioned in the upper housing portion and is configured to allow a second light to pass between the product scanning region and the interior region of the housing. A mirror arrangement is positioned within the interior region and includes a splitter mirror, a first mirror, a second mirror, and a third mirror. The splitter mirror is positioned directly in a first path of a first portion of the primary field-of-view and is configured to split the primary field-of-view along a vertical axis and redirect the first portion of the primary field-of-view from the first path to a second path towards the third mirror. The first mirror is positioned directly in a third path of a second portion of the primary field-of-view and is configured to redirect the second portion from the third path to a fourth path towards the second mirror. The second mirror is positioned directly in the fourth path and is configured to redirect the second portion through the generally upright window. The third mirror is positioned directly in the second path and is configured to redirect the first portion through the generally horizontal window. The bioptic barcode reader has no other imaging assembly communicatively coupled to the decode module and used to process images for decoding indicia.

In still yet another embodiment, the present invention is a bioptic barcode reader having a product scanning region, a housing having a lower housing portion with an upper surface facing the product scanning region, and an upper housing portion extending above the lower housing portion, the upper surface having a proximal edge adjacent the upper portion and a distal edge opposite the proximal edge. An imaging assembly has a primary field-of-view and includes a printed circuit board with a single image sensor. The printed circuit board is aligned at an acute angle to the upper surface and the printed circuit board and the image sensor arranged to direct the primary field-of-view at the acute angle to the upper surface and towards the upper housing portion. A decode module is communicatively coupled to the imaging assembly and configured to decode a barcode captured in an image by the imaging assembly. A generally horizontal window is positioned at the upper surface of the lower housing portion and is configured to allow a first light to pass between the product scanning region and an interior region of the housing and a generally upright window is positioned in the upper housing portion and is configured to allow a second light to pass between the product scanning region and the interior region of the housing. A mirror arrangement is positioned within the interior region and includes a splitter mirror, a first mirror, and a second mirror. The splitter mirror is positioned directly in a first path of a first portion of the primary field-of-view and is configured to split the primary field-of-view along a horizontal axis and redirect the first portion of the primary field-of-view from the first path to a second path towards the first mirror. The second mirror is positioned directly in a third path of a second portion of the primary field-of-view and is configured to redirect the second portion through the generally upright window. The first mirror is positioned directly in the second path and is configured to redirect the first portion through the generally horizontal window. The bioptic barcode reader has no other imaging assembly communicatively coupled to the decode module and used to process images for decoding indicia.

In still yet another embodiment, the present invention is a bioptic barcode reader having a product scanning region, a housing having a lower housing portion with an upper surface facing the product scanning region, and an upper housing portion extending above the lower housing portion, the upper surface having a proximal edge adjacent the upper portion and a distal edge opposite the proximal edge. An imaging assembly has a primary field-of-view and includes a printed circuit board with a single image sensor. The printed circuit board is aligned at an acute angle to the upper surface and the printed circuit board and the image sensor arranged to direct the primary field-of-view at the acute angle to the upper surface and towards the upper housing portion. A decode module is communicatively coupled to the imaging assembly and is configured to decode a barcode captured in an image by the imaging assembly. A generally horizontal window positioned at the upper surface of the lower housing portion and is configured to allow a first light to pass between the product scanning region and an interior region of the housing and a generally upright window is positioned in the upper housing portion and is configured to allow a second light to pass between the product scanning region and the interior region of the housing. A mirror arrangement is positioned within the interior region and includes a splitter mirror, a first mirror, a second mirror, and a third mirror. The splitter mirror is positioned directly in a first path of a first portion of the primary field-of-view and is configured to: split the primary field-of-view along a horizontal axis; split the first portion of the primary field-of-view into a first subfield and a second subfield; redirect the first subfield along a second path towards the second mirror; and redirect the second subfield along a third path towards the third mirror. The first mirror is positioned directly in a fourth path of a second portion of the primary field-of-view and is configured to redirect the second portion through the generally upright window. The second mirror is positioned directly in the second path and is configured to redirect the first subfield through the generally horizontal window. The third mirror is positioned directly in the third path and is configured to redirect the second subfield through the generally horizontal window. The bioptic barcode reader has no other imaging assembly communicatively coupled to the decode module and used to process images for decoding indicia.

In still yet another embodiment, the present invention is a bioptic barcode reader having a product scanning region, a housing having a lower housing portion with an upper surface facing the product scanning region, and an upper housing portion extending above the lower housing portion, the upper surface having a proximal edge adjacent the upper portion and a distal edge opposite the proximal edge. An imaging assembly has a primary field-of-view and includes a printed circuit board with a single image sensor. A decode module is communicatively coupled to the imaging assembly and is configured to decode a barcode captured in an image by the imaging assembly. A first window is configured to allow a first light to pass between the product scanning region and an interior region of the housing and a second window is configured to allow a second light to pass between the product scanning region and the interior region of the housing. A mirror arrangement is positioned within the interior region and includes a splitter mirror, a first mirror, a second mirror, and a third mirror. The splitter mirror is a concave splitter mirror having two planar reflective surfaces, is positioned directly in a first path of a first portion of the primary field-of-view, and is configured to: split the primary field-of-view along a horizontal axis; split the first portion of the primary field-of-view into a first subfield and a second subfield; redirect the first subfield along a second path towards the second mirror; and redirect the second subfield along a third path towards the third mirror such that the second path and the third path cross. The first mirror is positioned directly in a fourth path of a second portion of the primary field-of-view and is configured to redirect the second portion. The second mirror is positioned directly in the second path and is configured to redirect the first subfield. The third mirror is positioned directly in the third path and is configured to redirect the second subfield. The bioptic barcode reader has no other imaging assembly communicatively coupled to the decode module and used to process images for decoding indicia.

In still yet another embodiment, the present invention is a bioptic barcode reader having a product scanning region, a housing having a lower housing portion with an upper surface facing the product scanning region, and an upper housing portion extending above the lower housing portion, the upper surface having a proximal edge adjacent the upper portion and a distal edge opposite the proximal edge. A generally horizontal window is positioned at the upper surface of the lower housing portion and is configured to allow a first light to pass between the product scanning region and an interior region of the housing and a generally upright window is positioned in the upper housing portion and is configured to allow a second light to pass between the product scanning region and the interior region of the housing. The generally horizontal window has a width measured parallel to the proximal edge of the upper surface and a length measured perpendicular to the proximal edge and the width of the generally horizontal window is greater than the length.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

Figure 1:
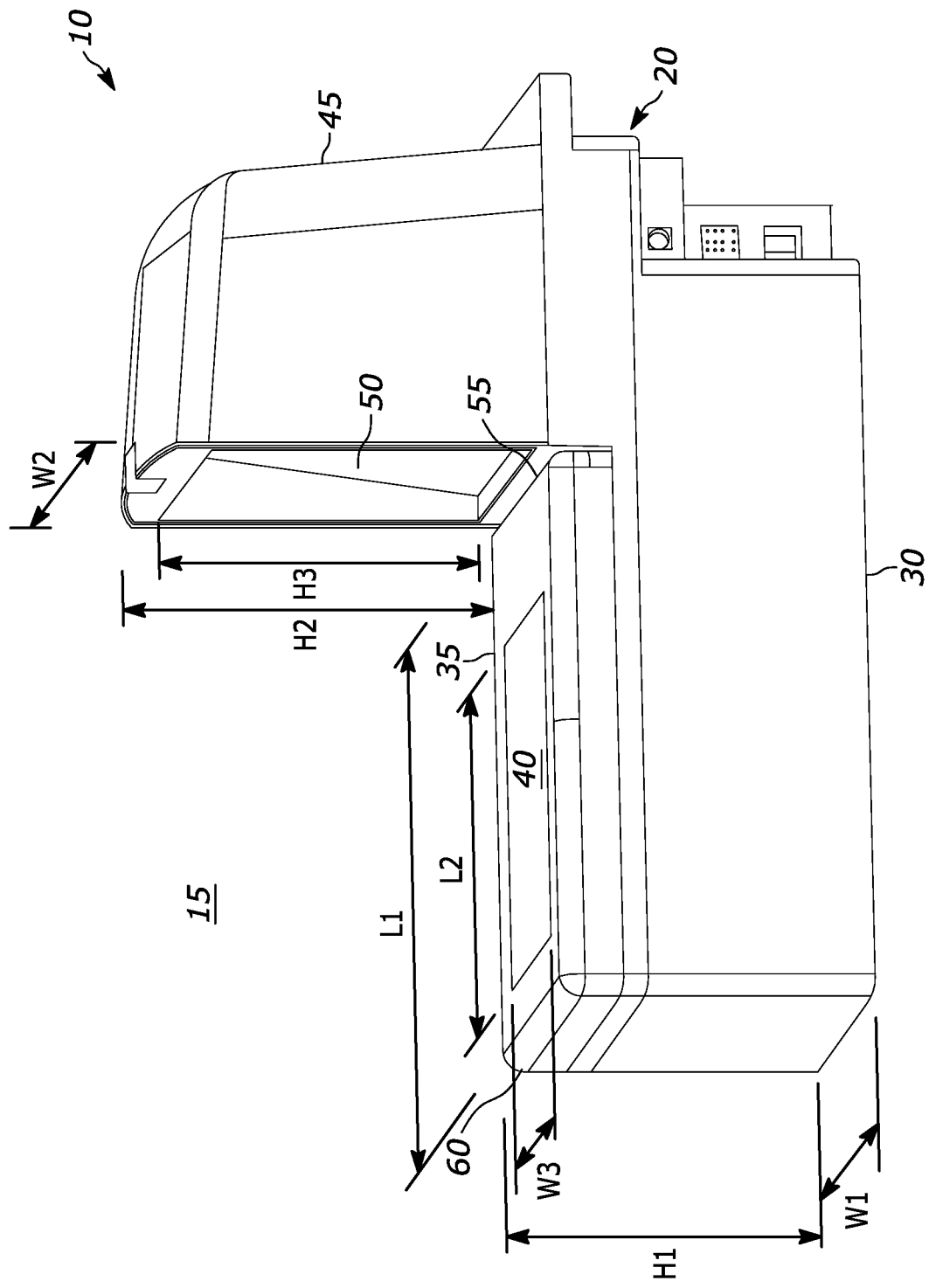
FIG. 1 illustrates a side perspective view of an example bioptic barcode reader.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

The examples disclosed herein relate to bioptic barcode readers that are compact and are smaller and less expensive to manufacture than traditional bioptic barcode readers. The example bioptic barcode readers disclosed herein do not have a scale, which is one factor in allowing them to be smaller than traditional bioptic barcode readers and still have excellent performance. The examples also use a single image sensor, for example a 2.3 megapixel image sensor (monochrome or color), with a primary field-of-view that is split and directed through the horizontal window of the bioptic barcode scanner and the upright window using minimal mirrors, which also allows the bioptic barcode readers disclosed herein to be made smaller.

Referring to FIG. 1, an example bioptic barcode reader 10 is shown that can be configured to be supported by a workstation, such as a checkout counter at a POS of a retail store, and has a product scanning region 15. Barcode reader 10 has a housing 20 that includes a lower housing portion 30 with an upper surface 35 that faces product scanning region 15 and an upper housing portion 45 that extends above lower housing portion 30. Upper surface 35 has a proximal edge 55 that is adjacent upper housing portion 45 and a distal edge 60 that is generally parallel to and opposite proximal edge 55. In the example shown, housing 20 preferably has a width W1 that is greater than or equal to 5 inches and less than or equal to 7 inches, lower housing portion 30 preferably has a height H1 that is greater than or equal to 3 inches, upper housing portion 45 preferably has a height H2 that is greater than or equal to 4 inches and less than or equal to 6 inches, and upper surface 35 has a length L1 between proximal edge 55 and distal edge 60 that is greater than or equal to 6 inches and less than or equal to 8 inches.

A generally horizontal window 40 is positioned at upper surface 35 of lower housing portion 30 and is configured to allow a first light to pass between product scanning region 15 and an interior region 25 of housing 20 and a generally upright window 50 is positioned in upper housing portion 45 and is configured to allow a second light to pass between product scanning region 15 and interior region 25 of housing 20. The first and second lights intersect to define product scanning region 15 of barcode reader 10 where a product can be scanned for sale at the POS. In the example shown, generally upright window 50 preferably has a height H3 that is greater than or equal to 3½ inches and less than or equal to 6 inches and a width W2 that is greater than or equal to 4 inches and less than or equal to 7 inches and generally horizontal window 40 has a width W3 that is greater than or equal to 3½ inches and less than or equal to 6 inches with upper surface 35 having a width W1 the same as housing 20, greater than or equal to 5 inches and less than or equal to 7 inches, and a length L2 that is greater than or equal to 3½ inches and less than or equal to 6 inches. In one particular example, generally horizontal window 40 can have a width W3 of 4 inches and a length L2 of 4 to 4½ inches (rather than the standard 6 inch length), which can make horizontal window 40 smaller and much less expensive if made of standard sapphire glass.

Figure 2:
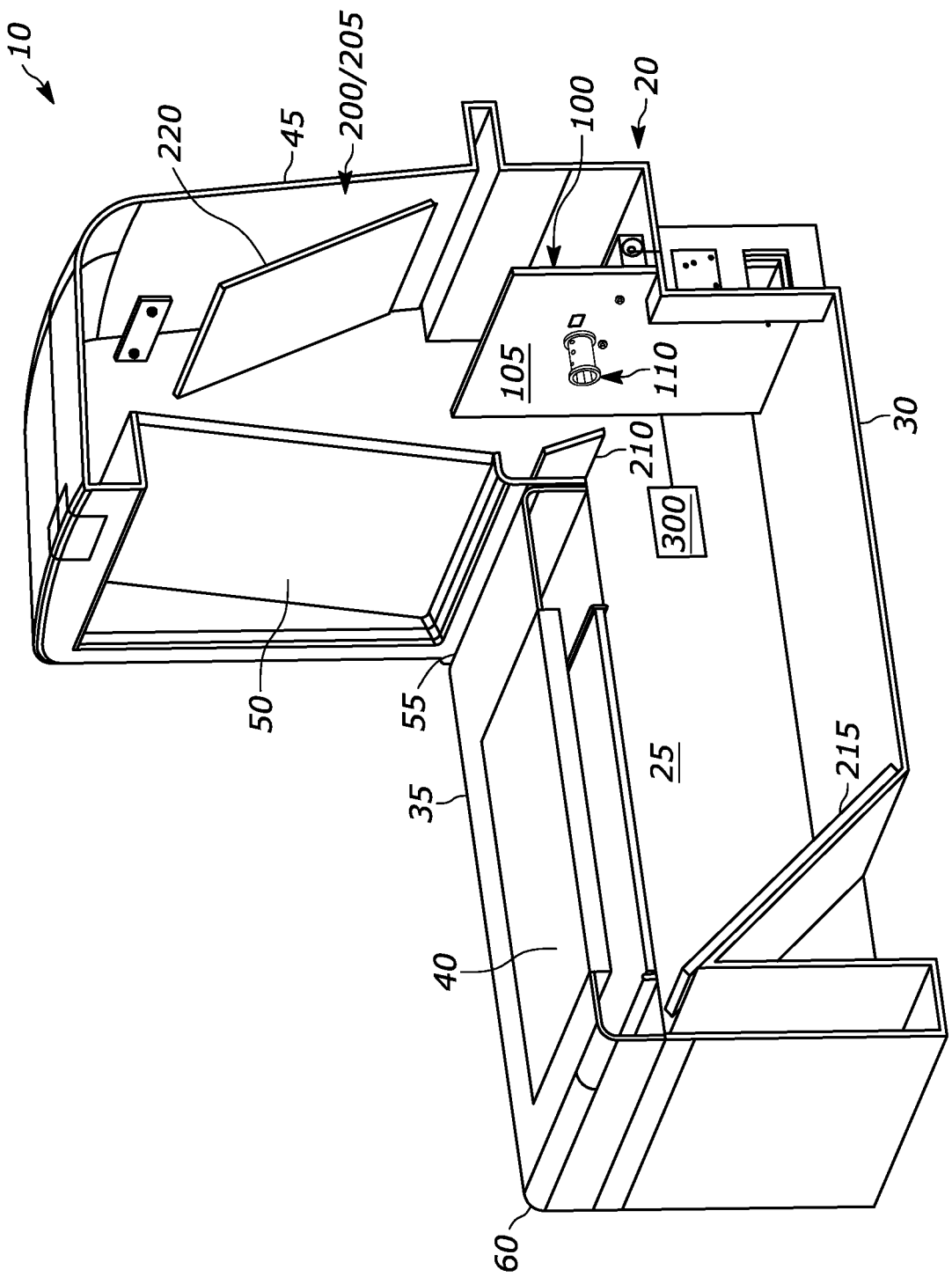
FIG. 2 illustrates a cutaway view of the example barcode reader of FIG. 1 with a first example imaging assembly and set of optical components.
Figure 3A:
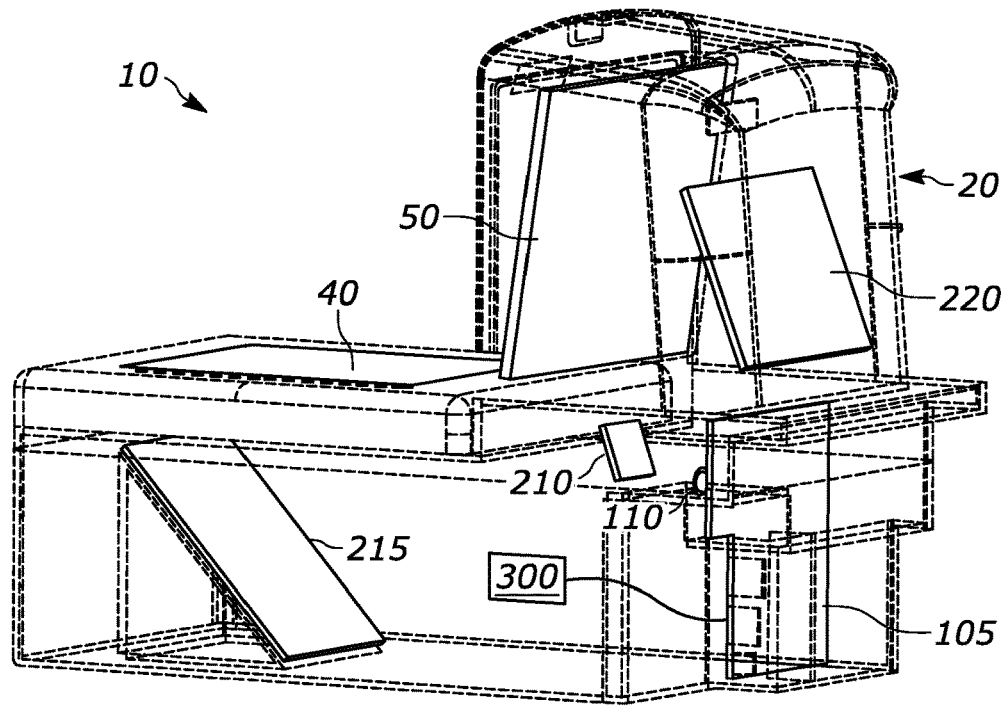
FIG. 3A is a side perspective view of the example bioptic barcode reader of FIG. 2 showing the first example imaging assembly and set of optical components.
Figure 3B:
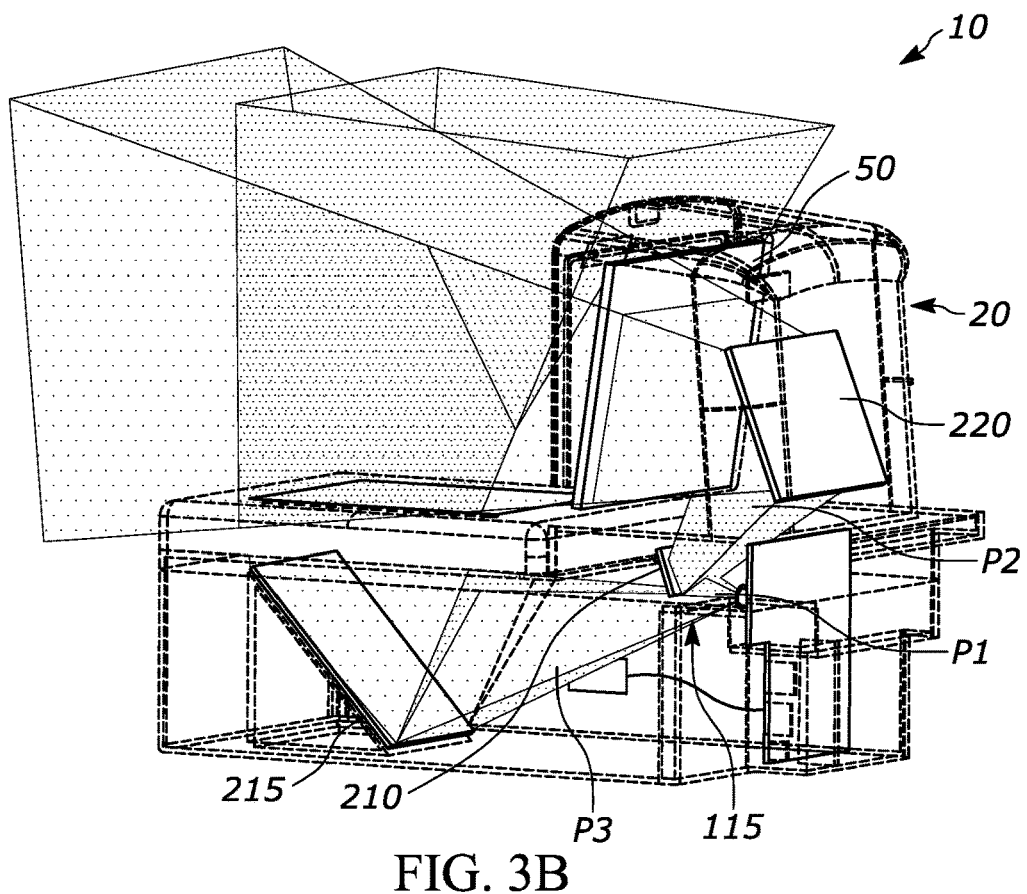
FIG. 3B illustrates the example bioptic barcode reader of FIG. 3A showing the various paths of the primary field-of-view of the imaging assembly.

Referring to FIGS. 2, 3A, and 3B, bioptic barcode reader 10 of FIG. 1 is illustrated with a first example imaging assembly 100 and a first example set of optical components 200 positioned within interior region 25 of housing 20 and a decode module 300 communicatively coupled to imaging assembly 100 and configured to decode a barcode captured in an image by imaging assembly 100. Imaging assembly 100 includes a printed circuit board 105 with a single image sensor 110 and has a primary field-of-view 115. Printed circuit board 105 is aligned generally perpendicular to upper surface 35 and printed circuit board 105 and image sensor 110 are arranged to direct primary field-of-view 115 generally parallel to upper surface 35 and towards distal edge 60 of upper surface 35. In this example, bioptic barcode reader 10 does not have any other imaging assembly communicatively coupled to decode module 300 and used to process images for decoding indicia, other than imaging assembly 100, which reduces the number of components and allows bioptic barcode reader 10 to be smaller and be manufactured less expensively than traditional bioptic barcode readers.

Optical components 200 are configured to divide primary field-of-view 115 and include a mirror arrangement 205 with a splitter mirror 210, a first mirror 215, and a second mirror 220. Splitter mirror 210 is positioned directly in a first path P1 of a first portion of primary field-of-view 115 and is configured to split primary field-of-view 115 along a horizontal axis and redirect the first portion of primary field-of-view 115 from first path P1 to a second path P2 towards second mirror 220. Splitter mirror 210 can be positioned to split primary field-of-view 115 in any proportion desired. For example, primary field-of-view can be split such that the first and second portions of primary field-of-view 115 are equal, the first portion is 0-25% larger than the second portion, or the second portion is 0-25% larger than the first portion, depending on the configuration and desired use of bioptic barcode reader 10. Second mirror 220 is positioned directly in second path P2 and is configured to redirect the first portion redirected from splitter mirror 210 through generally upright window 50. The first portion of primary-field-of view 115 that is redirected from second mirror 220 through generally upright window 50 can fill 50-100% of generally upright window 50 and, preferably, an area of the first portion of primary field-of-view 115 redirected through generally upright window 50, taken along a plane of generally upright window 50, is greater than an area of generally upright window 50 such that generally upright window 50 crops or reduces the first portion of primary field-of-view 115 and allows only a portion of the first portion to pass through. First mirror 215 is positioned directly in a third path P3 of a second portion of primary field-of-view 115 and is configured to redirect the second portion through generally horizontal window 40. The second portion of primary field-of-view 115 that is redirected from first mirror 215 through generally horizontal window 40 can fill 50-100% of generally horizontal window 40 and, preferably, an area of the second portion of primary field-of-view 115 redirected through generally horizontal window 40, taken along a plane of generally horizontal window 40, is greater than an area of generally horizontal window 40 such that generally horizontal window 40 crops or reduces the second portion of primary field-of-view 115 and allows only a portion of the second portion to pass through. For example, width W3 of generally horizontal window 40 could be greater than length L2 of generally horizontal window 40 such that a width of the second portion of primary field-of-view 115 allowed to pass through generally horizontal window 40 is greater than a length of the second portion of primary field-of-view 115 allowed to pass through generally horizontal window 40. In this example, mirror arrangement 205 does not have any other mirrors, other than splitter mirror 210, first mirror 215, and second mirror 220, which also reduces the number of components and allows bioptic barcode reader 10 to be smaller and be manufactured less expensively than traditional bioptic barcode readers.

Figure 4A:
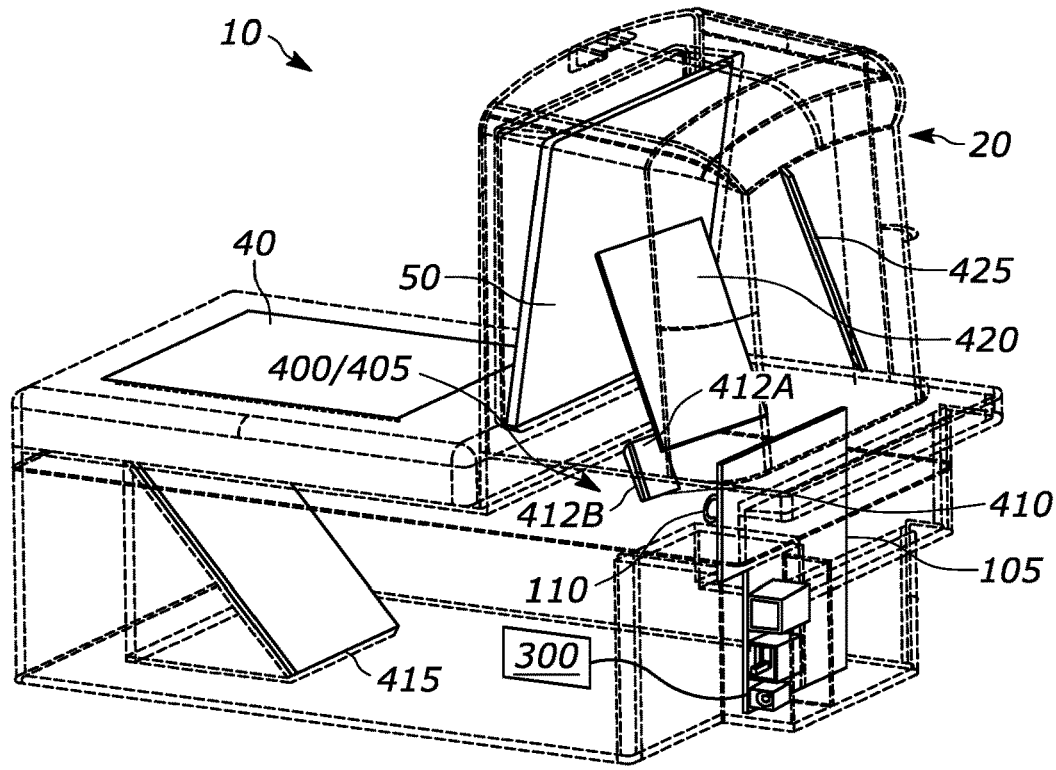
FIG. 4A illustrates the example bioptic barcode reader of FIG. 1 with a second example imaging assembly and set of optical components.
Figure 4B:
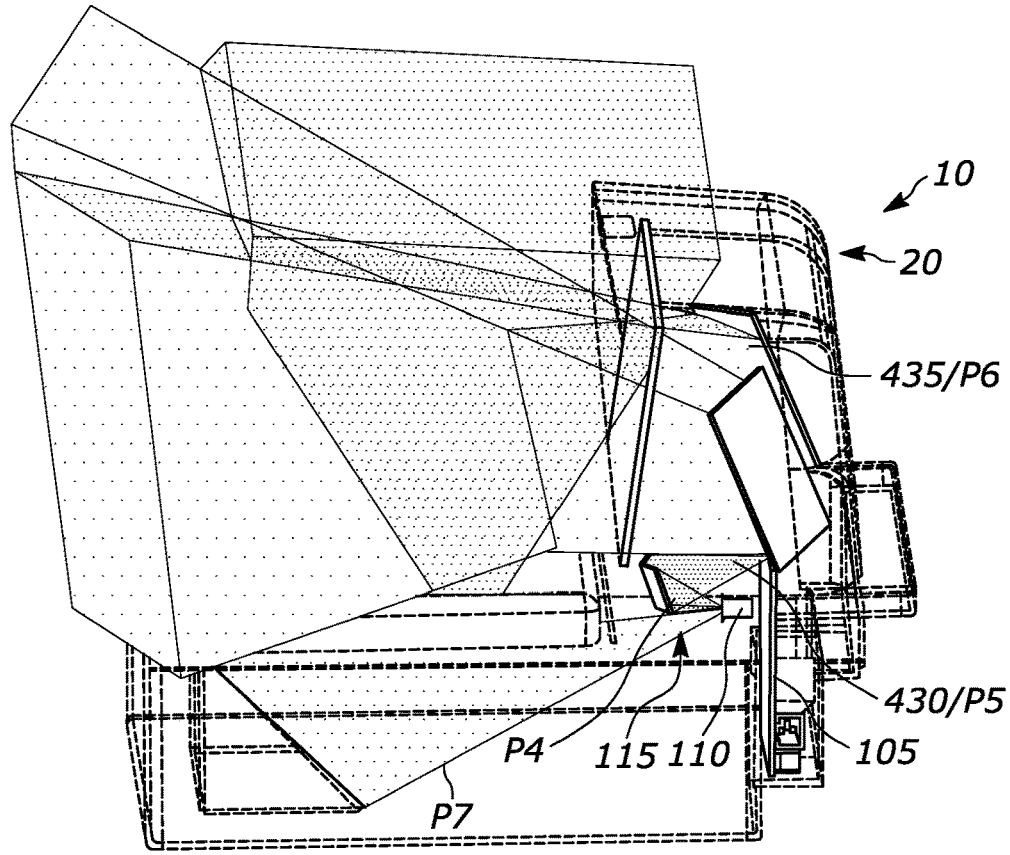
FIG. 4B illustrates the example bioptic barcode reader of FIG. 4A showing the various paths of the primary field-of-view of the imaging assembly.

Referring to FIGS. 4A and 4B, bioptic barcode reader 10 of FIG. 1 is illustrated with first example imaging assembly 100 described above and a second example set of optical components 400 positioned within interior region 25 of housing 20 and decode module 300 communicatively coupled to imaging assembly 100 and configured to decode a barcode captured in an image by imaging assembly 100. In this example, bioptic barcode reader 10 again does not have any other imaging assembly communicatively coupled to decode module 300 and used to process images for decoding indicia, other than imaging assembly 100, which reduces the number of components and allows bioptic barcode reader 10 to be smaller and be manufactured less expensively than traditional bioptic barcode readers.

Optical components 400 are configured to divide primary field-of-view 115 and include a mirror arrangement 405 with a splitter mirror 410, a first mirror 415, a second mirror 420, and a third mirror 425. Splitter mirror 410 is positioned directly in a first path P4 of a first portion of primary field-of-view 115 and is configured to split primary field-of-view 115 along a horizontal axis, split the first portion of primary field-of-view into a first subfield 430 and a second subfield 435, redirect first subfield 430 from first path P4 to a second path P5 towards second mirror 420, and redirect second subfield 435 from first path P4 to a third path P6 towards third mirror 425. In this example, splitter mirror 410 is a concave splitter mirror having first and second planar mirrors 412A, 412B that are arranged such that second path P5 from first planar mirror 412A and third path P6 from second planar mirror 412B cross. Having splitter mirror 410 in a concave configuration increases the internal path length between image sensor 110 and generally upright window 50, which allows for better barcode reading range and minimizes field-of-view twist, which enables more usable field-of-view through generally upright window 50. Splitter mirror 410 can be positioned to split primary field-of-view 115 in any proportion desired. For example, primary field-of-view can be split such that the first and second portions of primary field-of-view 115 are equal, the first portion is 0-25% larger than the second portion, or the second portion is 0-25% larger than the first portion, depending on the configuration and desired use of bioptic barcode reader 10.

Second mirror 420 is positioned directly in second path P5 and is configured to redirect first subfield 430 redirected from splitter mirror 410 through generally upright window 50 and third mirror 425 is positioned direct in third path P6 and is configured to redirect second subfield 435 redirected from splitter mirror 410 through generally upright window 50. First subfield 430 redirected from second mirror 420 through generally upright window 50 and second subfield 435 redirected from third mirror 425 through generally upright window 50 together can fill 50-100% of generally upright window 50. First mirror 415 is positioned directly in a fourth path P7 of a second portion of primary field-of-view 115 and is configured to redirect the second portion through generally horizontal window 40. The second portion of primary field-of-view 115 that is redirected from first mirror 415 through generally horizontal window 40 can fill 50-100% of generally horizontal window 40 and, preferably, an area of the second portion of primary field-of-view 115 redirected through generally horizontal window 40, taken along a plane of generally horizontal window 40, is greater than an area of generally horizontal window 40 such that generally horizontal window 40 crops or reduces the second portion of primary field-of-view 115 and allows only a portion of the second portion to pass through. For example, width W3 of generally horizontal window 40 could be greater than length L2 of generally horizontal window 40 such that a width of the second portion of primary field-of-view 115 allowed to pass through generally horizontal window 40 is greater than a length of the second portion of primary field-of-view 115 allowed to pass through generally horizontal window 40. In this example, mirror arrangement 405 does not have any other mirrors, other than splitter mirror 410, first mirror 415, second mirror 420, and third mirror 425, which also reduces the number of components and allows bioptic barcode reader 10 to be smaller and be manufactured less expensively than traditional bioptic barcode readers.

Figure 5A:
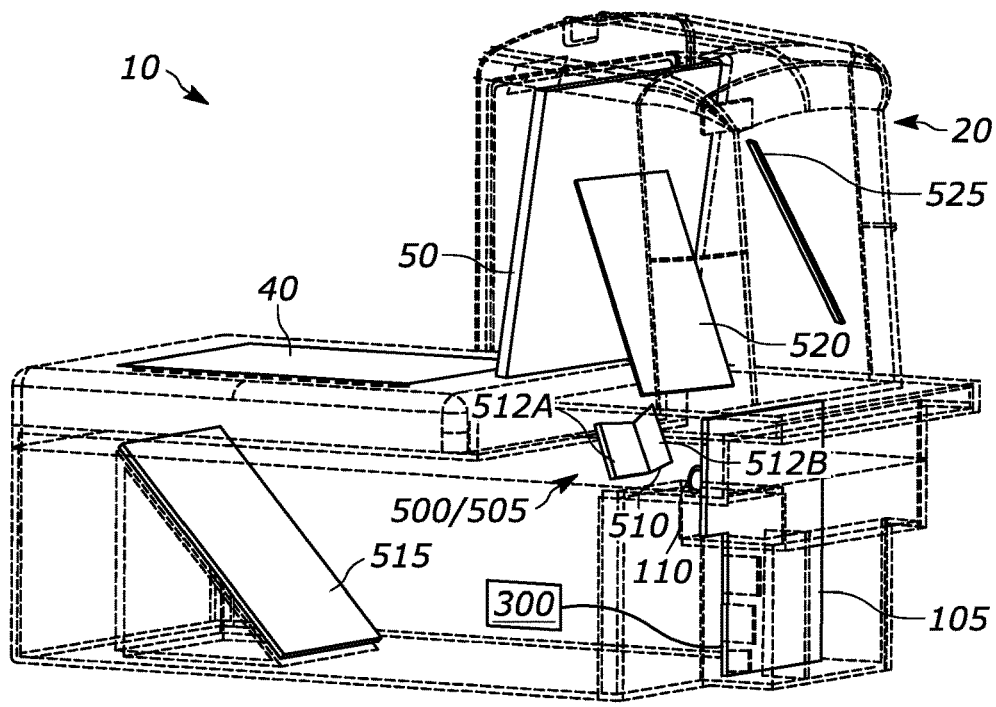
FIG. 5A illustrates the example bioptic barcode reader of FIG. 1 with a third example imaging assembly and set of optical components.
Figure 5B:
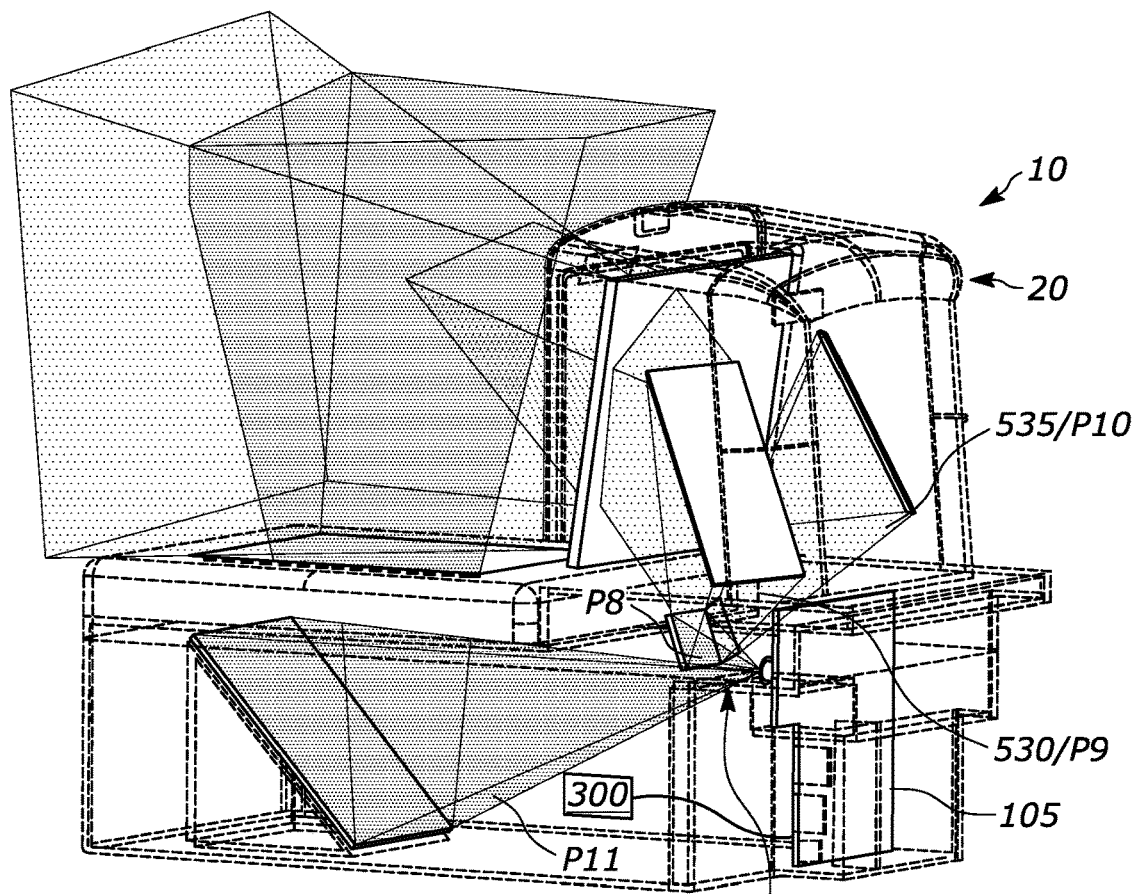
FIG. 5B illustrates the example bioptic barcode reader of FIG. 5A showing the various paths of the primary field-of-view of the imaging assembly.

Referring to FIGS. 5A and 5B, bioptic barcode reader 10 of FIG. 1 is illustrated with first example imaging assembly 100 described above and a third example set of optical components 500 positioned within interior region 25 of housing 20 and decode module 300 communicatively coupled to imaging assembly 100 and configured to decode a barcode captured in an image by imaging assembly 100. In this example, bioptic barcode reader 10 again does not have any other imaging assembly communicatively coupled to decode module 300 and used to process images for decoding indicia, other than imaging assembly 100, which reduces the number of components and allows bioptic barcode reader 10 to be smaller and be manufactured less expensively than traditional bioptic barcode readers.

Optical components 500 are configured to divide primary field-of-view 115 and include a mirror arrangement 505 with a splitter mirror 510, a first mirror 515, a second mirror 520, and a third mirror 525. Splitter mirror 510 is positioned directly in a first path P8 of a first portion of primary field-of-view 115 and is configured to split primary field-of-view 115 along a horizontal axis, split the first portion of primary field-of-view into a first subfield 530 and a second subfield 535, redirect first subfield 530 from first path P8 to a second path P9 towards second mirror 520, and redirect second subfield 535 from first path P8 to a third path P10 towards third mirror 525. In this example, splitter mirror 510 is a convex splitter mirror having first and second planar mirrors 512A, 512B that are arranged such that second path P9 from first planar mirror 512A and third path P10 from second planar mirror 512B diverge. Splitter mirror 510 can be positioned to split primary field-of-view 115 in any proportion desired. For example, primary field-of-view can be split such that the first and second portions of primary field-of-view 115 are equal, the first portion is 0-25% larger than the second portion, or the second portion is 0-25% larger than the first portion, depending on the configuration and desired use of bioptic barcode reader 10.

Second mirror 520 is positioned directly in second path P9 and is configured to redirect first subfield 530 redirected from splitter mirror 510 through generally upright window 50 and third mirror 525 is positioned direct in third path P10 and is configured to redirect second subfield 535 redirected from splitter mirror 510 through generally upright window 50. First subfield 530 redirected from second mirror 520 through generally upright window 50 and second subfield 535 redirected from third mirror 525 through generally upright window 50 together can fill 50-100% of generally upright window 50. First mirror 515 is positioned directly in a fourth path P11 of a second portion of primary field-of-view 115 and is configured to redirect the second portion through generally horizontal window 40. The second portion of primary field-of-view 115 that is redirected from first mirror 515 through generally horizontal window 40 can fill 50-100% of generally horizontal window 40 and, preferably, an area of the second portion of primary field-of-view 115 redirected through generally horizontal window 40, taken along a plane of generally horizontal window 40, is greater than an area of generally horizontal window 40 such that generally horizontal window 40 crops or reduces the second portion of primary field-of-view 115 and allows only a portion of the second portion to pass through. For example, width W3 of generally horizontal window 40 could be greater than length L2 of generally horizontal window 40 such that a width of the second portion of primary field-of-view 115 allowed to pass through generally horizontal window 40 is greater than a length of the second portion of primary field-of-view 115 allowed to pass through generally horizontal window 40. In this example, mirror arrangement 505 does not have any other mirrors, other than splitter mirror 510, first mirror 515, second mirror 520, and third mirror 525, which also reduces the number of components and allows bioptic barcode reader 10 to be smaller and be manufactured less expensively than traditional bioptic barcode readers.

Figure 6A:
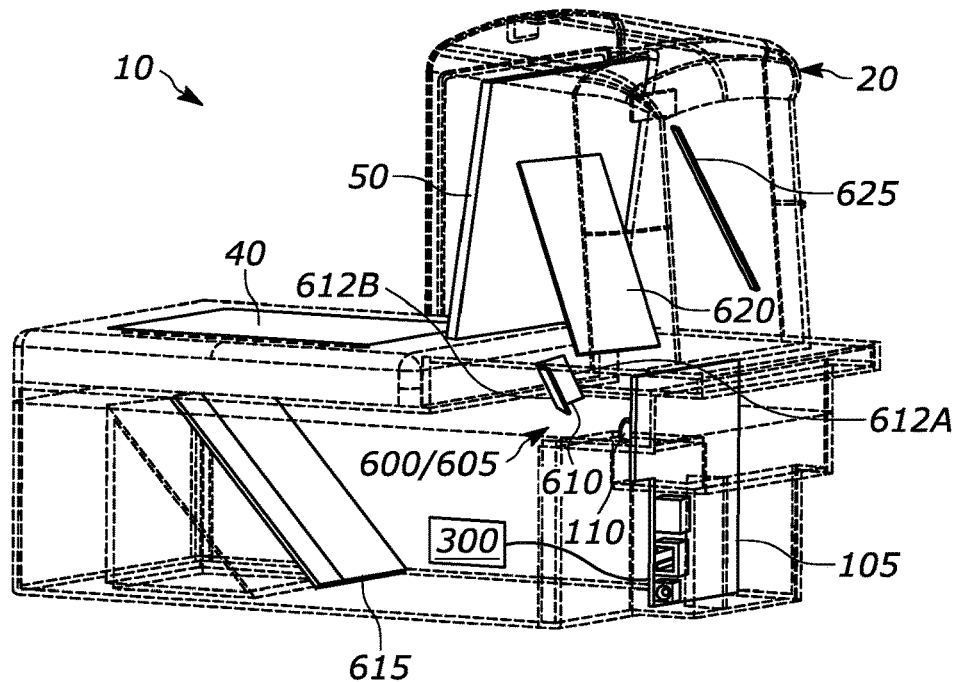
FIG. 6A illustrates the example bioptic barcode reader of FIG. 1 with a fourth example imaging assembly and set of optical components.
Figure 6B:
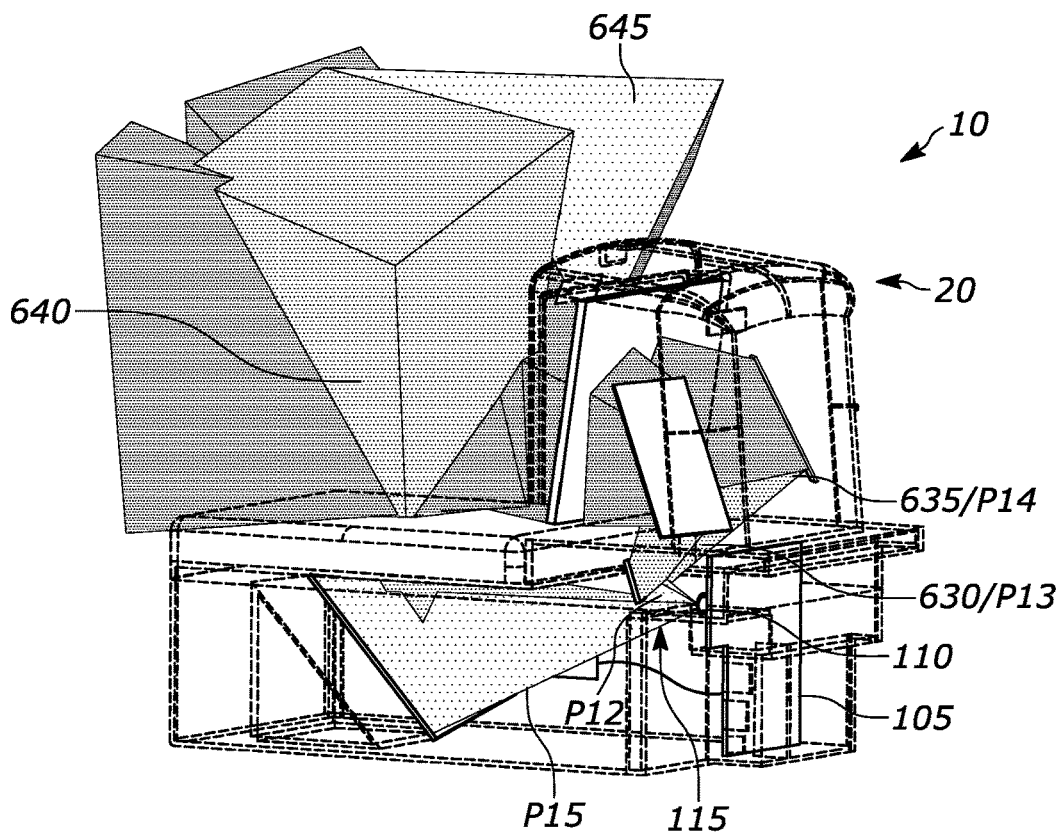
FIG. 6B illustrates the example bioptic barcode reader of FIG. 6A showing the various paths of the primary field-of-view of the imaging assembly.

Referring to FIGS. 6A and 6B, bioptic barcode reader 10 of FIG. 1 is illustrated with first example imaging assembly 100 described above and a fourth example set of optical components 600 positioned within interior region 25 of housing 20 and decode module 300 communicatively coupled to imaging assembly 100 and configured to decode a barcode captured in an image by imaging assembly 100. In this example, bioptic barcode reader 10 again does not have any other imaging assembly communicatively coupled to decode module 300 and used to process images for decoding indicia, other than imaging assembly 100, which reduces the number of components and allows bioptic barcode reader 10 to be smaller and be manufactured less expensively than traditional bioptic barcode readers.

Optical components 600 are configured to divide primary field-of-view 115 and include a mirror arrangement 605 with a splitter mirror 610, a first mirror 615, a second mirror 620, and a third mirror 625. Splitter mirror 610 is positioned directly in a first path P12 of a first portion of primary field-of-view 115 and is configured to split primary field-of-view 115 along a horizontal axis, split the first portion of primary field-of-view into a first subfield 630 and a second subfield 635, redirect first subfield 630 from first path P12 to a second path P13 towards second mirror 620, and redirect second subfield 635 from first path P12 to a third path P14 towards third mirror 625. In this example, splitter mirror 610 is a concave splitter mirror having first and second planar mirrors 612A, 612B that are arranged such that second path P13 from first planar mirror 612A and third path P14 from second planar mirror 612B cross. Having splitter mirror 610 in a concave configuration increases the internal path length between image sensor 110 and generally upright window 50, which allows for better barcode reading range and minimizes field-of-view twist, which enables more usable field-of-view through generally upright window 50. Splitter mirror 610 can be positioned to split primary field-of-view 115 in any proportion desired. For example, primary field-of-view can be split such that the first and second portions of primary field-of-view 115 are equal, the first portion is 0-25% larger than the second portion, or the second portion is 0-25% larger than the first portion, depending on the configuration and desired use of bioptic barcode reader 10.

Second mirror 620 is positioned directly in second path P13 and is configured to redirect first subfield 630 redirected from splitter mirror 610 through generally upright window 50 and third mirror 625 is positioned direct in third path P14 and is configured to redirect second subfield 635 redirected from splitter mirror 610 through generally upright window 50. First subfield 630 redirected from second mirror 620 through generally upright window 50 and second subfield 635 redirected from third mirror 625 through generally upright window 50 together can fill 50-100% of generally upright window 50. First mirror 615 is positioned directly in a fourth path P15 of a second portion of primary field-of-view 115 and is configured to redirect the second portion through generally horizontal window 40. In this example, first mirror 615 is a concave splitter mirror and is configured to split the second portion of primary field-of-view 115 into a third subfield 640 and a fourth subfield 645, redirect third subfield 640 through generally horizontal window 40, and redirect fourth subfield 645 through generally horizontal window 40. Third subfield 640 and fourth subfield 645 together can fill 50-100% of generally horizontal window 40. In this example, mirror arrangement 605 does not have any other mirrors, other than splitter mirror 610, first mirror 615, second mirror 620, and third mirror 625, which also reduces the number of components and allows bioptic barcode reader 10 to be smaller and be manufactured less expensively than traditional bioptic barcode readers.

Figure 7A:
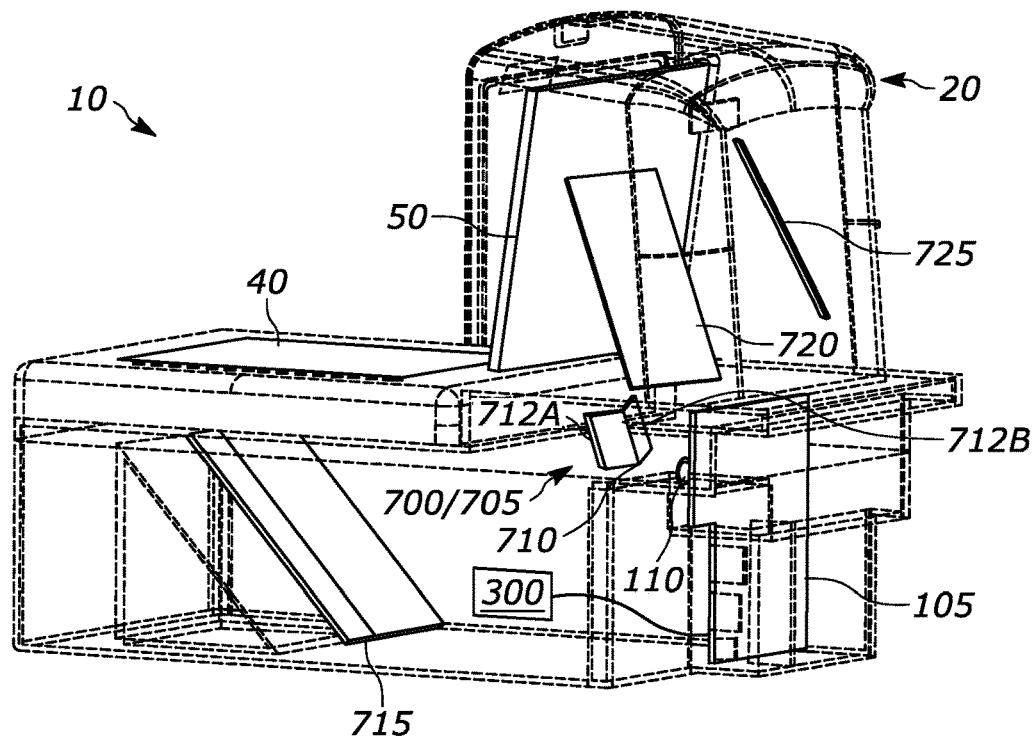
FIG. 7A illustrates the example bioptic barcode reader of FIG. 1 with a fifth example imaging assembly and set of optical components.
Figure 7B:
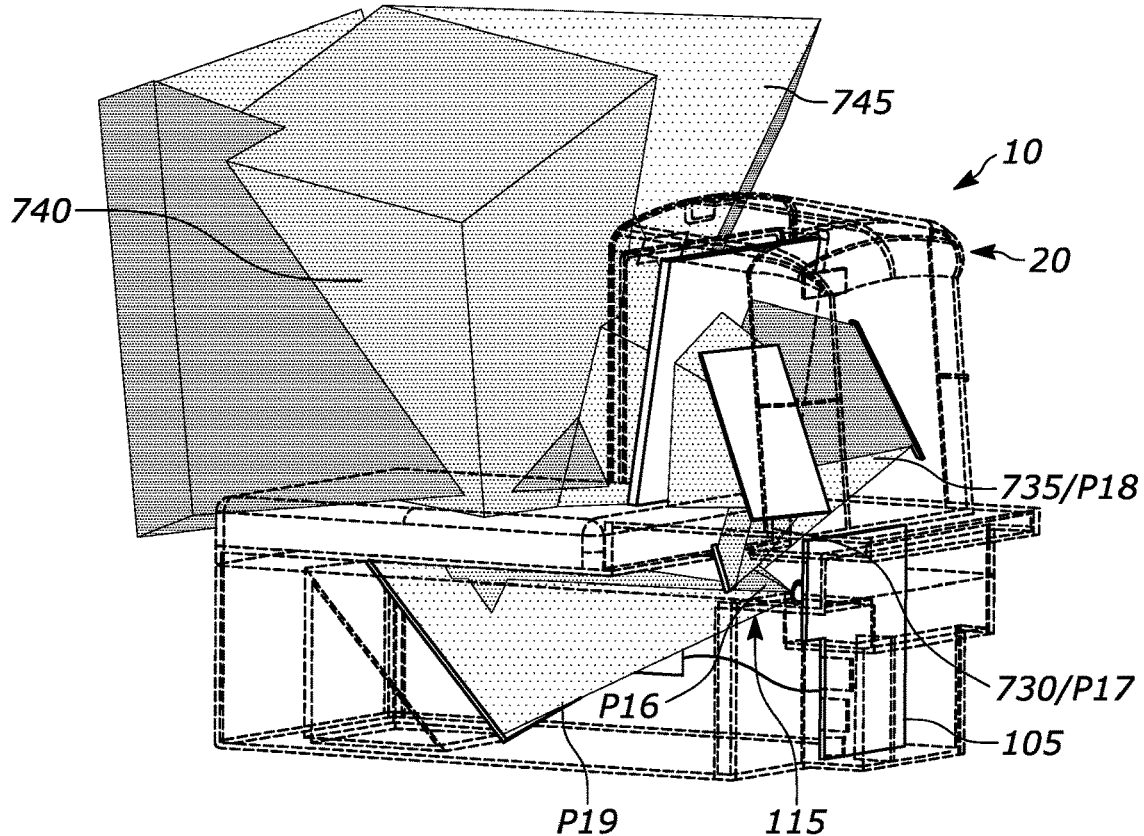
FIG. 7B illustrates the example bioptic barcode reader of FIG. 7A showing the various paths of the primary field-of-view of the imaging assembly.

Referring to FIGS. 7A and 7B, bioptic barcode reader 10 of FIG. 1 is illustrated with first example imaging assembly 100 described above and a fifth example set of optical components 700 positioned within interior region 25 of housing 20 and decode module 300 communicatively coupled to imaging assembly 100 and configured to decode a barcode captured in an image by imaging assembly 100. In this example, bioptic barcode reader 10 again does not have any other imaging assembly communicatively coupled to decode module 300 and used to process images for decoding indicia, other than imaging assembly 100, which reduces the number of components and allows bioptic barcode reader 10 to be smaller and be manufactured less expensively than traditional bioptic barcode readers.

Optical components 700 are configured to divide primary field-of-view 115 and include a mirror arrangement 705 with a splitter mirror 710, a first mirror 715, a second mirror 720, and a third mirror 725. Splitter mirror 710 is positioned directly in a first path P16 of a first portion of primary field-of-view 115 and is configured to split primary field-of-view 115 along a horizontal axis, split the first portion of primary field-of-view into a first subfield 730 and a second subfield 735, redirect first subfield 730 from first path P16 to a second path P17 towards second mirror 720, and redirect second subfield 735 from first path P16 to a third path P18 towards third mirror 725. In this example, splitter mirror 710 is a convex splitter mirror having first and second planar mirrors 712A, 712B that are arranged such that second path P17 from first planar mirror 712A and third path P18 from second planar mirror 712B diverge. Splitter mirror 710 can be positioned to split primary field-of-view 115 in any proportion desired. For example, primary field-of-view can be split such that the first and second portions of primary field-of-view 115 are equal, the first portion is 0-25% larger than the second portion, or the second portion is 0-25% larger than the first portion, depending on the configuration and desired use of bioptic barcode reader 10.

Second mirror 720 is positioned directly in second path P17 and is configured to redirect first subfield 730 redirected from splitter mirror 710 through generally upright window 50 and third mirror 725 is positioned direct in third path P18 and is configured to redirect second subfield 735 redirected from splitter mirror 710 through generally upright window 50. First subfield 730 redirected from second mirror 720 through generally upright window 50 and second subfield 735 redirected from third mirror 725 through generally upright window 50 together can fill 50-100% of generally upright window 50. First mirror 715 is positioned directly in a fourth path P19 of a second portion of primary field-of-view 115 and is configured to redirect the second portion through generally horizontal window 40. In this example, first mirror 715 is a concave splitter mirror and is configured to split the second portion of primary field-of-view 115 into a third subfield 740 and a fourth subfield 745, redirect third subfield 740 through generally horizontal window 40, and redirect fourth subfield 745 through generally horizontal window 40. Third subfield 740 and fourth subfield 745 together can fill 50-100% of generally horizontal window 40. In this example, mirror arrangement 705 does not have any other mirrors, other than splitter mirror 710, first mirror 715, second mirror 720, and third mirror 725, which also reduces the number of components and allows bioptic barcode reader 10 to be smaller and be manufactured less expensively than traditional bioptic barcode readers.

Figure 8A:
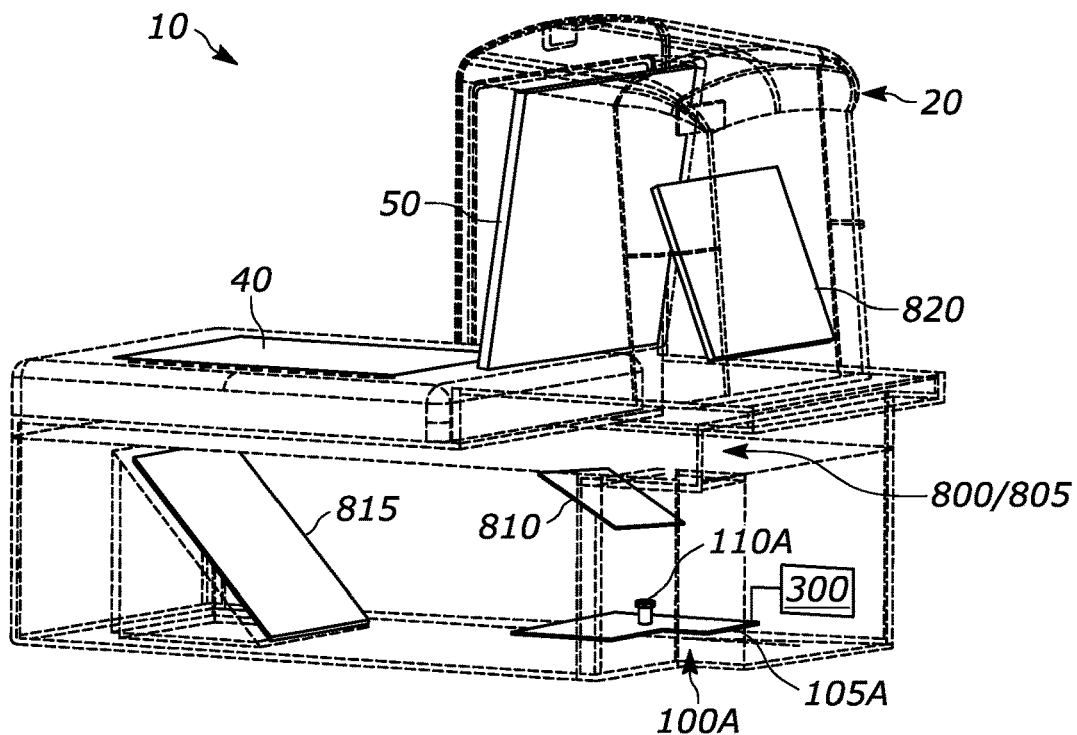
FIG. 8A illustrates the example bioptic barcode reader of FIG. 1 with a sixth example imaging assembly and set of optical components.
Figure 8B:
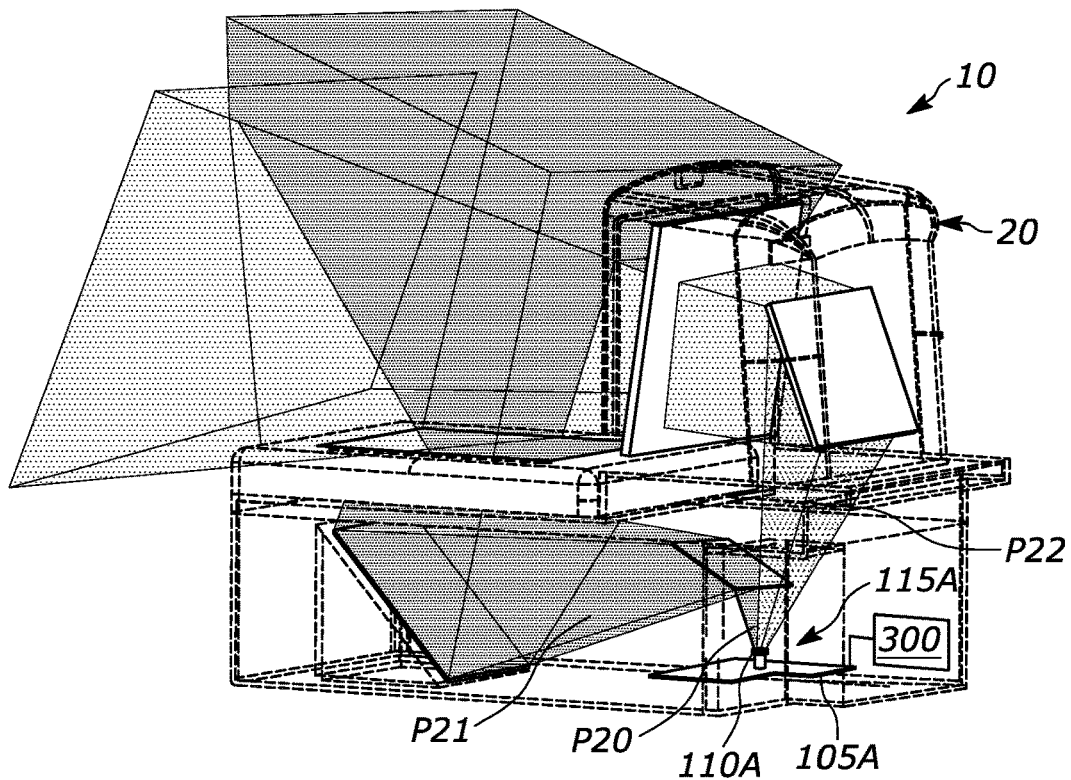
FIG. 8B illustrates the example bioptic barcode reader of FIG. 8A showing the various paths of the primary field-of-view of the imaging assembly.

Referring to FIGS. 8A and 8B, bioptic barcode reader 10 of FIG. 1 is illustrated with a second example imaging assembly 100A and a sixth example set of optical components 800 positioned within interior region 25 of housing 20 and a decode module 300 communicatively coupled to imaging assembly 100A and configured to decode a barcode captured in an image by imaging assembly 100A. Imaging assembly 100A includes a printed circuit board 105A with a single image sensor 110A and has a primary field-of-view 115A. Printed circuit board 105A is aligned generally horizontal to upper surface 35 and printed circuit board 105A and image sensor 110A are arranged to direct primary field-of-view 115A generally perpendicular to upper surface 35 and towards upper housing portion 45. In this example, bioptic barcode reader 10 does not have any other imaging assembly communicatively coupled to decode module 300 and used to process images for decoding indicia, other than imaging assembly 100A, which reduces the number of components and allows bioptic barcode reader 10 to be smaller and be manufactured less expensively than traditional bioptic barcode readers.

Optical components 800 are configured to divide primary field-of-view 115A and include a mirror arrangement 805 with a splitter mirror 810, a first mirror 815, and a second mirror 820. Splitter mirror 810 is positioned directly in a first path P20 of a first portion of primary field-of-view 115A and is configured to split primary field-of-view 115A along a horizontal axis and redirect the first portion of primary field-of-view 115A from first path P20 to a second path P21 towards first mirror 815. Splitter mirror 810 can be positioned to split primary field-of-view 115A in any proportion desired. For example, primary field-of-view can be split such that the first and second portions of primary field-of-view 115A are equal, the first portion is 0-25% larger than the second portion, or the second portion is 0-25% larger than the first portion, depending on the configuration and desired use of bioptic barcode reader 10. Second mirror 820 is positioned directly in a third path P22 of the second portion of primary field-of-view 115A and is configured to redirect the second portion through generally upright window 50. The second portion of primary field-of-view 115A that is redirected from second mirror 820 through generally upright window 50 can fill 50-100% of generally upright window 50 and, preferably, an area of the second portion of primary field-of-view 115A redirected through generally upright window 50, taken along a plane of generally upright window 50, is greater than an area of generally upright window 50 such that generally upright window 50 crops or reduces the second portion of primary field-of-view 115A and allows only a portion of the second portion to pass through. First mirror 815 is positioned directly in a second path P21 of a first portion of primary field-of-view 115A and is configured to redirect the first portion through generally horizontal window 40. The first portion of primary field-of-view 115A that is redirected from first mirror 815 through generally horizontal window 40 can fill 50-100% of generally horizontal window 40 and, preferably, an area of the first portion of primary field-of-view 115A redirected through generally horizontal window 40, taken along a plane of generally horizontal window 40, is greater than an area of generally horizontal window 40 such that generally horizontal window 40 crops or reduces the first portion of primary field-of-view 115A and allows only a portion of the first portion to pass through. For example, width W3 of generally horizontal window 40 could be greater than length L2 of generally horizontal window 40 such that a width of the first portion of primary field-of-view 115A allowed to pass through generally horizontal window 40 is greater than a length of the first portion of primary field-of-view 115A allowed to pass through generally horizontal window 40. In this example, mirror arrangement 805 does not have any other mirrors, other than splitter mirror 810, first mirror 815, and second mirror 820, which also reduces the number of components and allows bioptic barcode reader 10 to be smaller and be manufactured less expensively than traditional bioptic barcode readers.

Figure 9A:
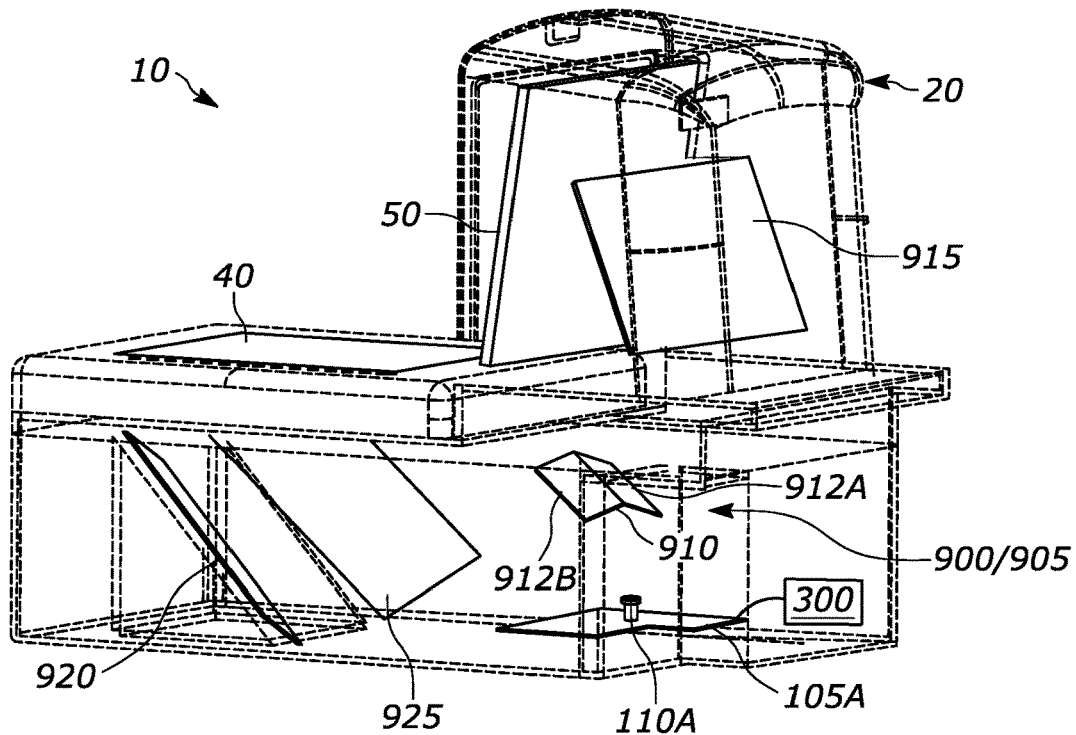
FIG. 9A illustrates the example bioptic barcode reader of FIG. 1 with a seventh example imaging assembly and set of optical components.
Figure 9B:
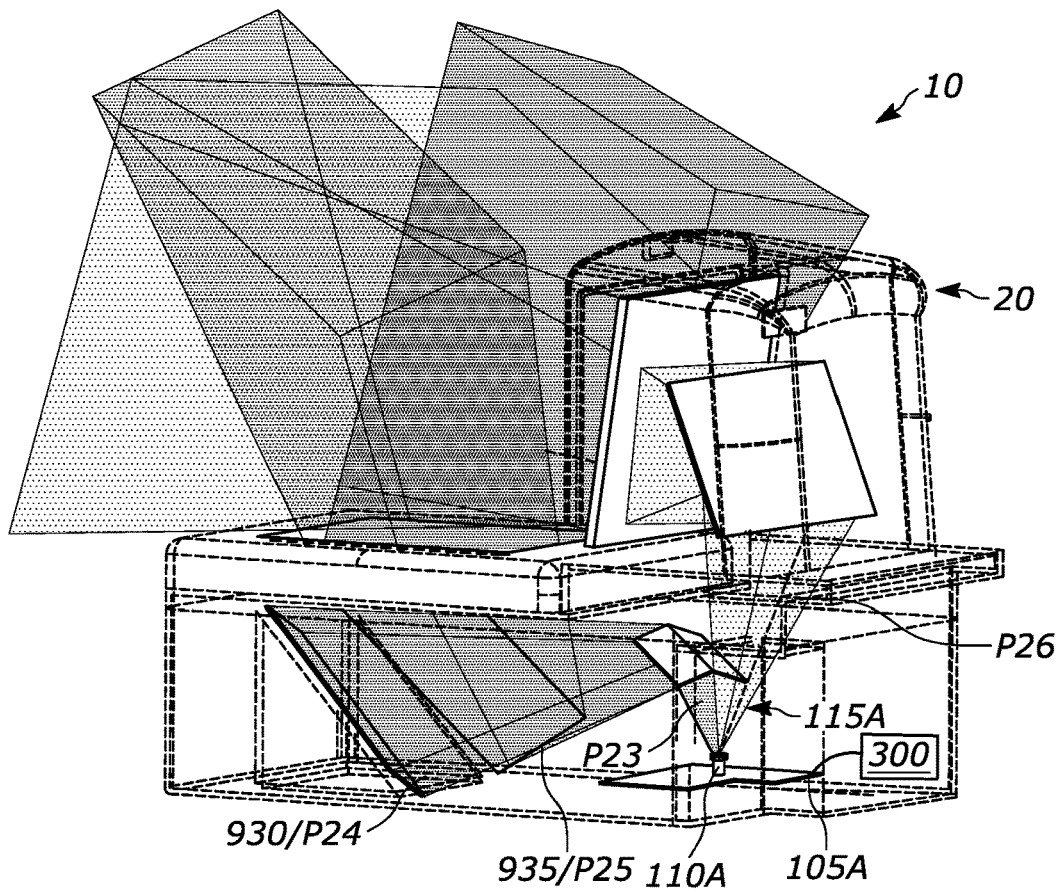
FIG. 9B illustrates the example bioptic barcode reader of FIG. 9A showing the various paths of the primary field-of-view of the imaging assembly.

Referring to FIGS. 9A and 9B, bioptic barcode reader 10 of FIG. 1 is illustrated with second example imaging assembly 100A described above and a seventh example set of optical components 900 positioned within interior region 25 of housing 20 and decode module 300 communicatively coupled to imaging assembly 100A and configured to decode a barcode captured in an image by imaging assembly 100A. In this example, bioptic barcode reader 10 again does not have any other imaging assembly communicatively coupled to decode module 300 and used to process images for decoding indicia, other than imaging assembly 100A, which reduces the number of components and allows bioptic barcode reader 10 to be smaller and be manufactured less expensively than traditional bioptic barcode readers.

Optical components 900 are configured to divide primary field-of-view 115A and include a mirror arrangement 905 with a splitter mirror 910, a first mirror 915, a second mirror 920, and a third mirror 925. Splitter mirror 910 is positioned directly in a first path P23 of a first portion of primary field-of-view 115A and is configured to split primary field-of-view 115A along a horizontal axis, split the first portion of primary field-of-view 115A into a first subfield 930 and a second subfield 935, redirect first subfield 930 from first path P23 to a second path P24 towards second mirror 920, and redirect second subfield 935 from first path P23 to a third path P25 towards third mirror 925. In this example, splitter mirror 910 is a concave splitter mirror having first and second planar mirrors 912A, 912B that are arranged such that second path P24 from first planar mirror 912A and third path P25 from second planar mirror 912B cross. Having splitter mirror 910 in a concave configuration increases the internal path length between image sensor 110A and generally horizontal window 40, which allows for better barcode reading range and minimizes field-of-view twist, which enables more usable field-of-view through generally horizontal window 40. Alternatively, splitter mirror 910 could be a convex splitter mirror that is arranged such that second path P24 from first planar mirror 912A and third path P25 from second planar mirror 912B diverge. Splitter mirror 910 can be positioned to split primary field-of-view 115A in any proportion desired. For example, primary field-of-view 115A can be split such that the first and second portions of primary field-of-view 115A are equal, the first portion is 0-25% larger than the second portion, or the second portion is 0-25% larger than the first portion, depending on the configuration and desired use of bioptic barcode reader 10.

Second mirror 920 is positioned directly in second path P24 and is configured to redirect first subfield 930 redirected from splitter mirror 910 through generally horizontal window 40 and third mirror 925 is positioned direct in third path P25 and is configured to redirect second subfield 935 redirected from splitter mirror 910 through generally horizontal window 40. First subfield 930 redirected from second mirror 920 through generally horizontal window 40 and second subfield 935 redirected from third mirror 925 through generally horizontal window 40 together can fill 50-100% of generally horizontal window 40. First mirror 915 is positioned directly in a fourth path P26 of a second portion of primary field-of-view 115A and is configured to redirect the second portion through generally upright window 50. The second portion of primary field-of-view 115A that is redirected from first mirror 915 through generally upright window 50 can fill 50-100% of generally upright window 50 and, preferably, an area of the second portion of primary field-of-view 115A redirected through generally upright window 50, taken along a plane of generally upright window 50, is greater than an area of generally upright window 50 such that generally upright window 50 crops or reduces the second portion of primary field-of-view 115A and allows only a portion of the second portion to pass through. For example, width W2 of generally upright window 50 could be greater than length/height H3 of generally upright window 50 such that a width of the second portion of primary field-of-view 115A allowed to pass through generally upright window 50 is greater than a length of the second portion of primary field-of-view 115A allowed to pass through generally upright window 50. In this example, mirror arrangement 905 does not have any other mirrors, other than splitter mirror 910, first mirror 915, second mirror 920, and third mirror 925, which also reduces the number of components and allows bioptic barcode reader 10 to be smaller and be manufactured less expensively than traditional bioptic barcode readers.

Figure 10A:
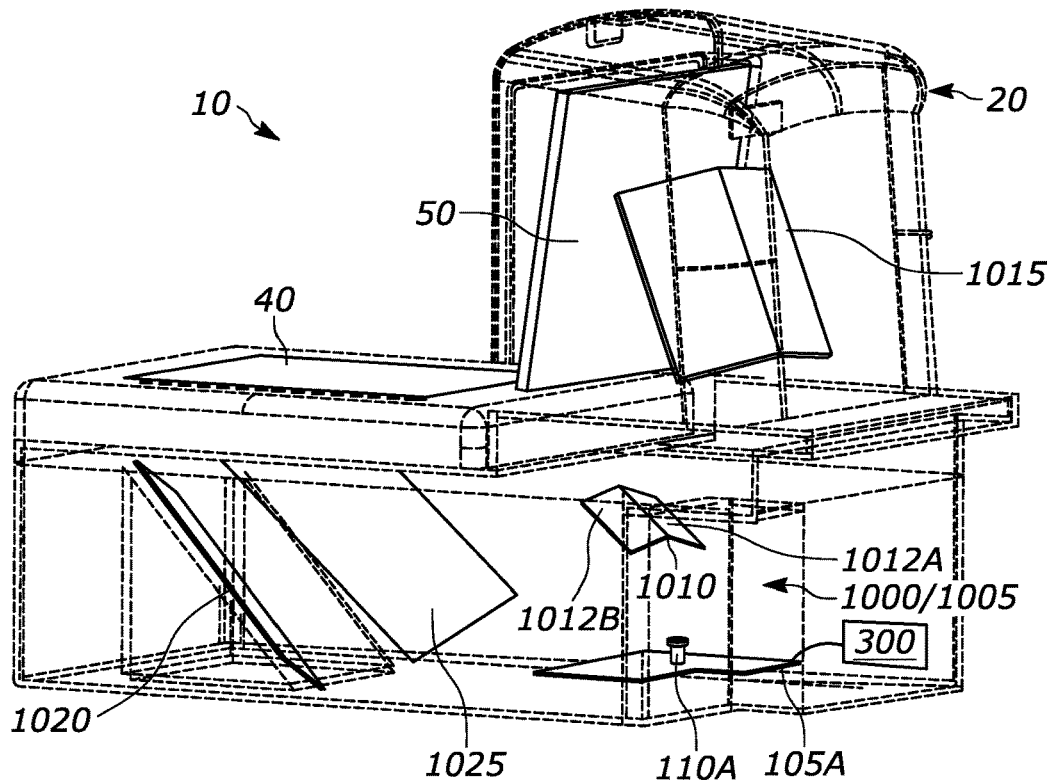
FIG. 10A illustrates the example bioptic barcode reader of FIG. 1 with an eighth example imaging assembly and set of optical components.
Figure 10B:
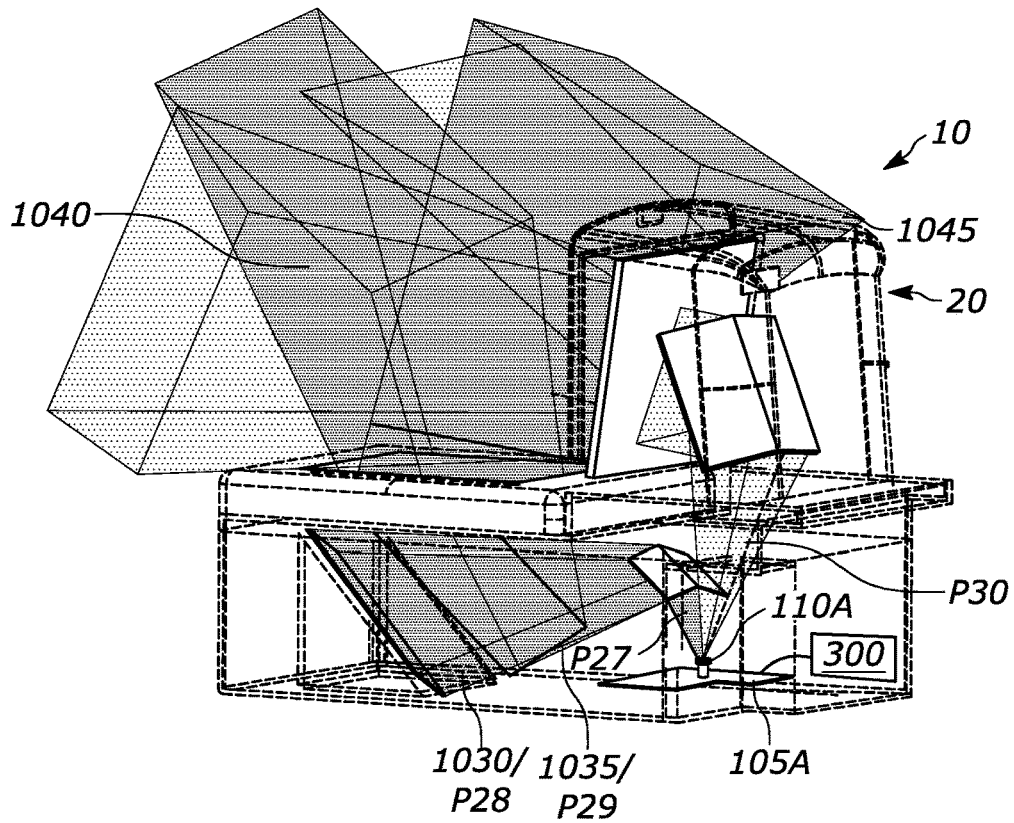
FIG. 10B illustrates the example bioptic barcode reader of FIG. 10A showing the various paths of the primary field-of-view of the imaging assembly.

Referring to FIGS. 10A and 10B, bioptic barcode reader 10 of FIG. 1 is illustrated with second example imaging assembly 100A described above and an eighth example set of optical components 1000 positioned within interior region 25 of housing 20 and decode module 300 communicatively coupled to imaging assembly 100A and configured to decode a barcode captured in an image by imaging assembly 100A. In this example, bioptic barcode reader 10 again does not have any other imaging assembly communicatively coupled to decode module 300 and used to process images for decoding indicia, other than imaging assembly 100A, which reduces the number of components and allows bioptic barcode reader 10 to be smaller and be manufactured less expensively than traditional bioptic barcode readers.

Optical components 1000 are configured to divide primary field-of-view 115A and include a mirror arrangement 1005 with a splitter mirror 1010, a first mirror 1015, a second mirror 1020, and a third mirror 1025. Splitter mirror 1010 is positioned directly in a first path P27 of a first portion of primary field-of-view 115A and is configured to split primary field-of-view 115A along a horizontal axis, split the first portion of primary field-of-view 115A into a first subfield 1030 and a second subfield 1035, redirect first subfield 1030 from first path P27 to a second path P28 towards second mirror 1020, and redirect second subfield 1035 from first path P27 to a third path P29 towards third mirror 1025. In this example, splitter mirror 1010 is a concave splitter mirror having first and second planar mirrors 1012A, 1012B that are arranged such that second path P28 from first planar mirror 1012A and third path P29 from second planar mirror 1012B cross. Having splitter mirror 1010 in a concave configuration increases the internal path length between image sensor 110A and generally horizontal window 40, which allows for better barcode reading range and minimizes field-of-view twist, which enables more usable field-of-view through generally horizontal window 40. Alternatively, splitter mirror 1010 could be a convex splitter mirror that is arranged such that second path P28 from first planar mirror 1012A and third path P29 from second planar mirror 1012B diverge. Splitter mirror 1010 can be positioned to split primary field-of-view 115A in any proportion desired. For example, primary field-of-view 115A can be split such that the first and second portions of primary field-of-view 115A are equal, the first portion is 0-25% larger than the second portion, or the second portion is 0-25% larger than the first portion, depending on the configuration and desired use of bioptic barcode reader 10.

Second mirror 1020 is positioned directly in second path P28 and is configured to redirect first subfield 1030 redirected from splitter mirror 1010 through generally horizontal window 40 and third mirror 1025 is positioned direct in third path P29 and is configured to redirect second subfield 1035 redirected from splitter mirror 1010 through generally horizontal window 40. First subfield 1030 redirected from second mirror 1020 through generally horizontal window 40 and second subfield 1035 redirected from third mirror 1025 through generally horizontal window 40 together can fill 50-100% of generally horizontal window 40. First mirror 1015 is positioned directly in a fourth path P30 of a second portion of primary field-of-view 115A and is configured to redirect the second portion through generally upright window 50. In this example, first mirror 1015 is a concave splitter mirror and is configured to split the second portion of primary field-of-view 115A into a third subfield 1040 and a fourth subfield 1045, redirect third subfield 1040 through generally upright window 50, and redirect fourth subfield 1045 through generally upright window 50. Third subfield 1040 and fourth subfield 1045 together can fill 50-100% of generally upright window 50. In this example, mirror arrangement 1005 does not have any other mirrors, other than splitter mirror 1010, first mirror 1015, second mirror 1020, and third mirror 1025, which also reduces the number of components and allows bioptic barcode reader 10 to be smaller and be manufactured less expensively than traditional bioptic barcode readers.

Figure 11A:
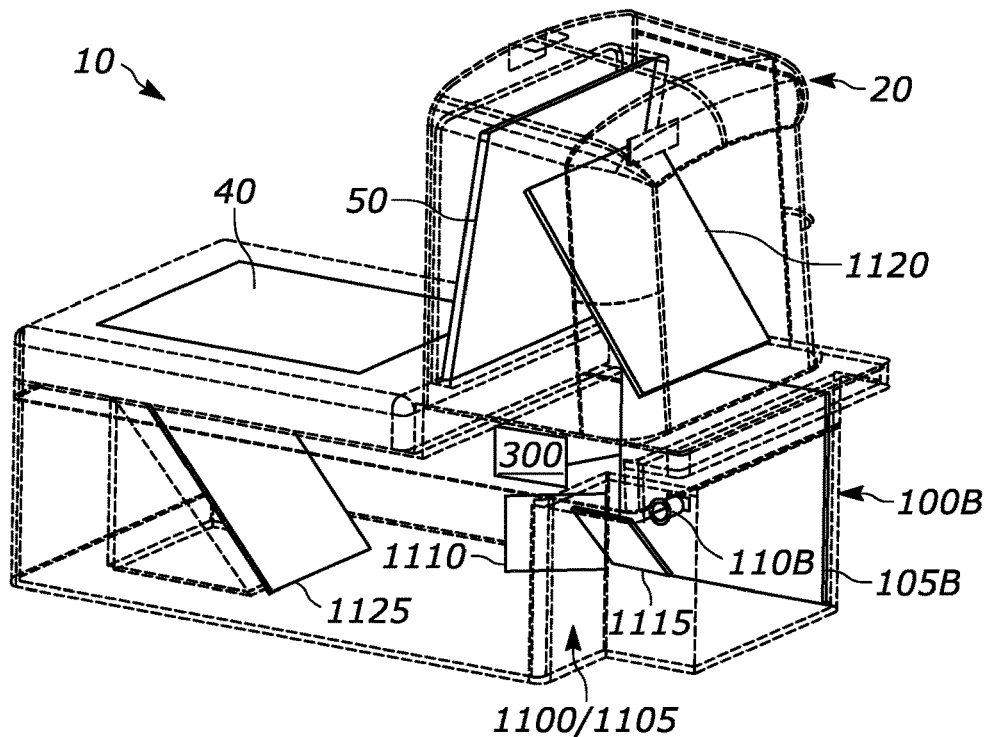
FIG. 11A illustrates the example bioptic barcode reader of FIG. 1 with a ninth example imaging assembly and set of optical components.
Figure 11B:
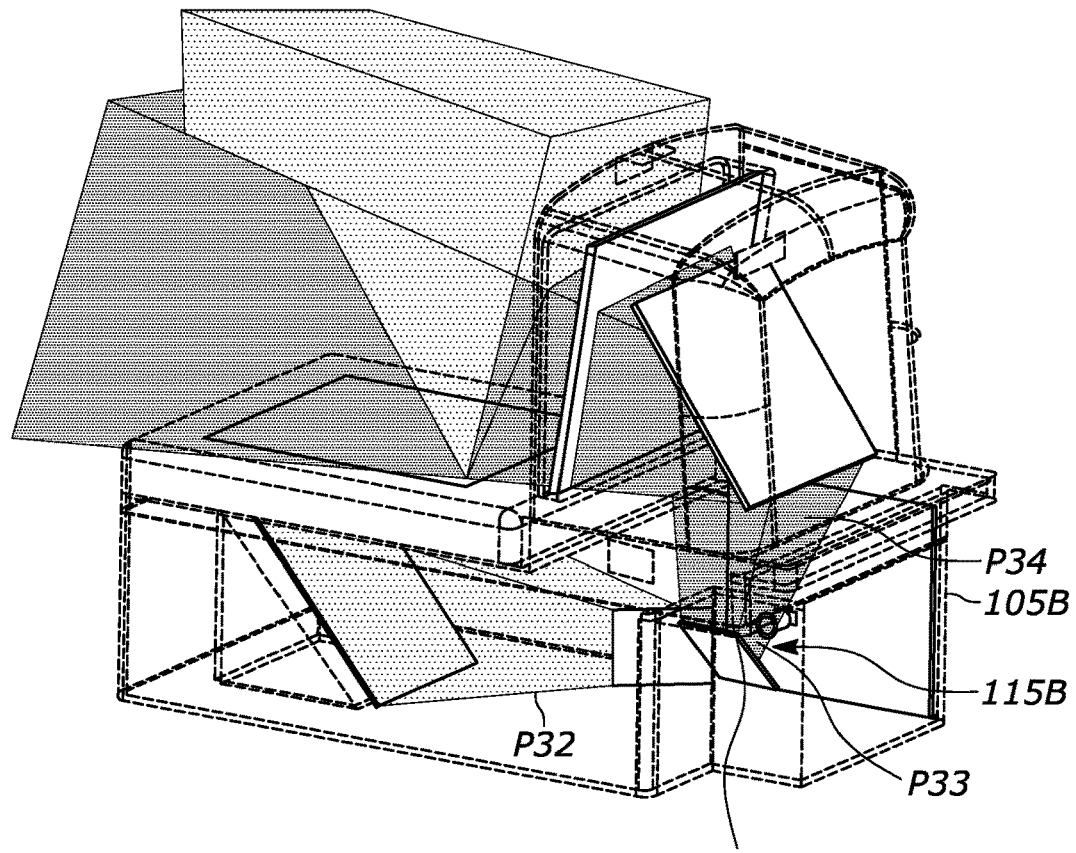
FIG. 11B illustrates the example bioptic barcode reader of FIG. 11A showing the various paths of the primary field-of-view of the imaging assembly.

Referring to FIGS. 11A and 11B, bioptic barcode reader 10 of FIG. 1 is illustrated with a third example imaging assembly 100B and a ninth example set of optical components 1100 positioned within interior region 25 of housing 20 and a decode module 300 communicatively coupled to imaging assembly 100B and configured to decode a barcode captured in an image by imaging assembly 100B. Imaging assembly 100B includes a printed circuit board 105B with a single image sensor 110B and has a primary field-of-view 115B. Printed circuit board 105 is aligned generally perpendicular to upper surface 35 and printed circuit board 105B and image sensor 110B are arranged to direct primary field-of-view 115B generally parallel to proximal edge 55 of upper surface 35. Orientation of printed circuit board 105B and imaging sensor 110B in this manner splits primary field-of-view 115B in such a manner as to orient the long axis of both portions to the long axis of their respective windows. In this example, bioptic barcode reader 10 does not have any other imaging assembly communicatively coupled to decode module 300 and used to process images for decoding indicia, other than imaging assembly 100B, which reduces the number of components and allows bioptic barcode reader 10 to be smaller and be manufactured less expensively than traditional bioptic barcode readers.

Optical components 1100 are configured to divide primary field-of-view 115B and include a mirror arrangement 1105 with a splitter mirror 1110, a first mirror 1115, a second mirror 1120, and a third mirror 1125. Splitter mirror 1110 is positioned directly in a first path P31 of a first portion of primary field-of-view 115B and is configured to split primary field-of-view 115B along a vertical axis and redirect the first portion of primary field-of-view 115B from first path P31 to a second path P32 towards third mirror 1125. Splitter mirror 1110 can be positioned to split primary field-of-view 115B in any proportion desired. For example, primary field-of-view 115B can be split such that the first and second portions of primary field-of-view 115B are equal, the first portion is 0-25% larger than the second portion, or the second portion is 0-25% larger than the first portion, depending on the configuration and desired use of bioptic barcode reader 10. Third mirror 1125 is positioned directly in second path P32 and is configured to redirect the first portion redirected from splitter mirror 1110 through generally horizontal window 40. The first portion of primary-field-of view 115B that is redirected from third mirror 1125 through generally horizontal window 40 can fill 50-100% of generally horizontal window 40 and, preferably, an area of the first portion of primary field-of-view 115B redirected through generally horizontal window 40, taken along a plane of generally horizontal window 40, is greater than an area of generally horizontal window 40 such that generally horizontal window 40 crops or reduces the first portion of primary field-of-view 115B and allows only a portion of the first portion to pass through. For example, length L2 of generally horizontal window 40 could be greater than width W3 of generally horizontal window 40 such that a length of the first portion of primary field-of-view 115B allowed to pass through generally horizontal window 40 is greater than a width of the first portion of primary field-of-view 115B allowed to pass through generally horizontal window 40. First mirror 1115 is positioned directly in a third path P33 of the second portion of primary field-of-view 115B and is configured to redirect the second portion of primary field-of-view 115B from third path P33 to a fourth path P34 and towards second mirror 1120. Second mirror 1120 is positioned directly in fourth path P34 and is configured to redirect the second portion through generally upright window 50. The second portion of primary field-of-view 115B that is redirected from second mirror 1120 through generally upright window 50 can fill 50-100% of generally upright window 50 and, preferably, an area of the second portion of primary field-of-view 115B redirected through generally upright window 50, taken along a plane of generally upright window 50, is greater than an area of generally upright window 50 such that generally upright window 50 crops or reduces the second portion of primary field-of-view 115B and allows only a portion of the second portion to pass through. In this example, mirror arrangement 1105 does not have any other mirrors, other than splitter mirror 1110, first mirror 1115, second mirror 1120, and third mirror 1125, which also reduces the number of components and allows bioptic barcode reader 10 to be smaller and be manufactured less expensively than traditional bioptic barcode readers.

Figure 12A:
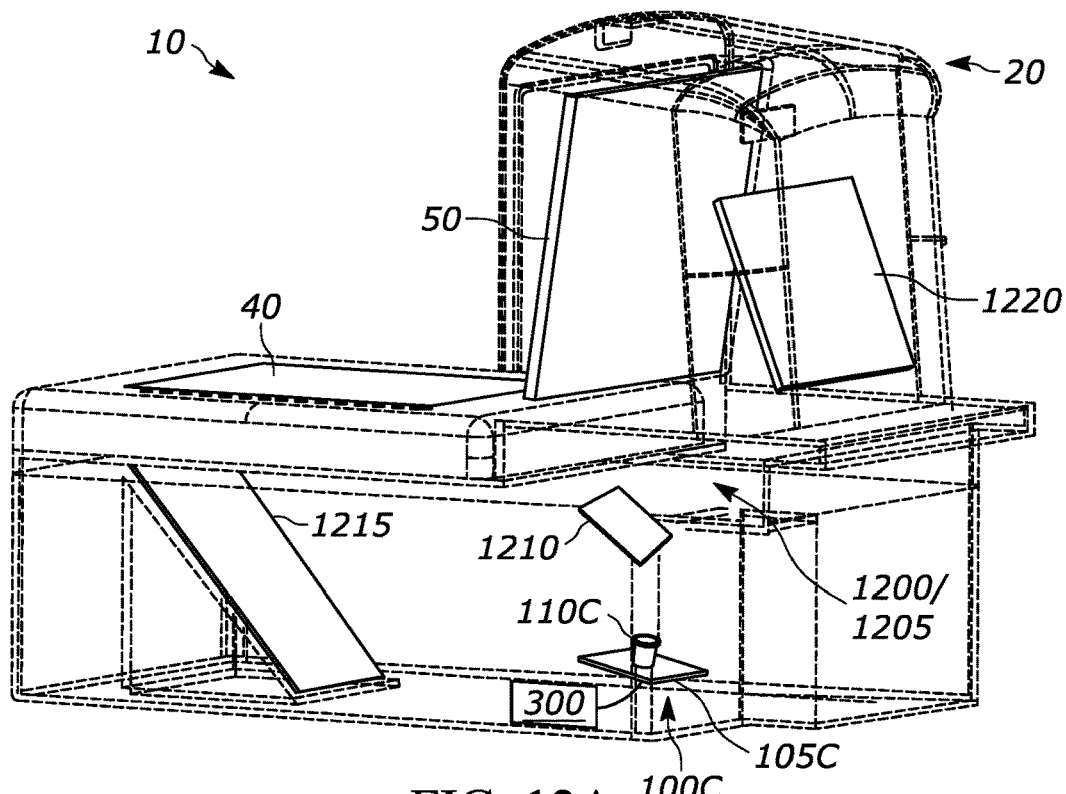
FIG. 12A illustrates the example bioptic barcode reader of FIG. 1 with a tenth example imaging assembly and set of optical components.
Figure 12B:
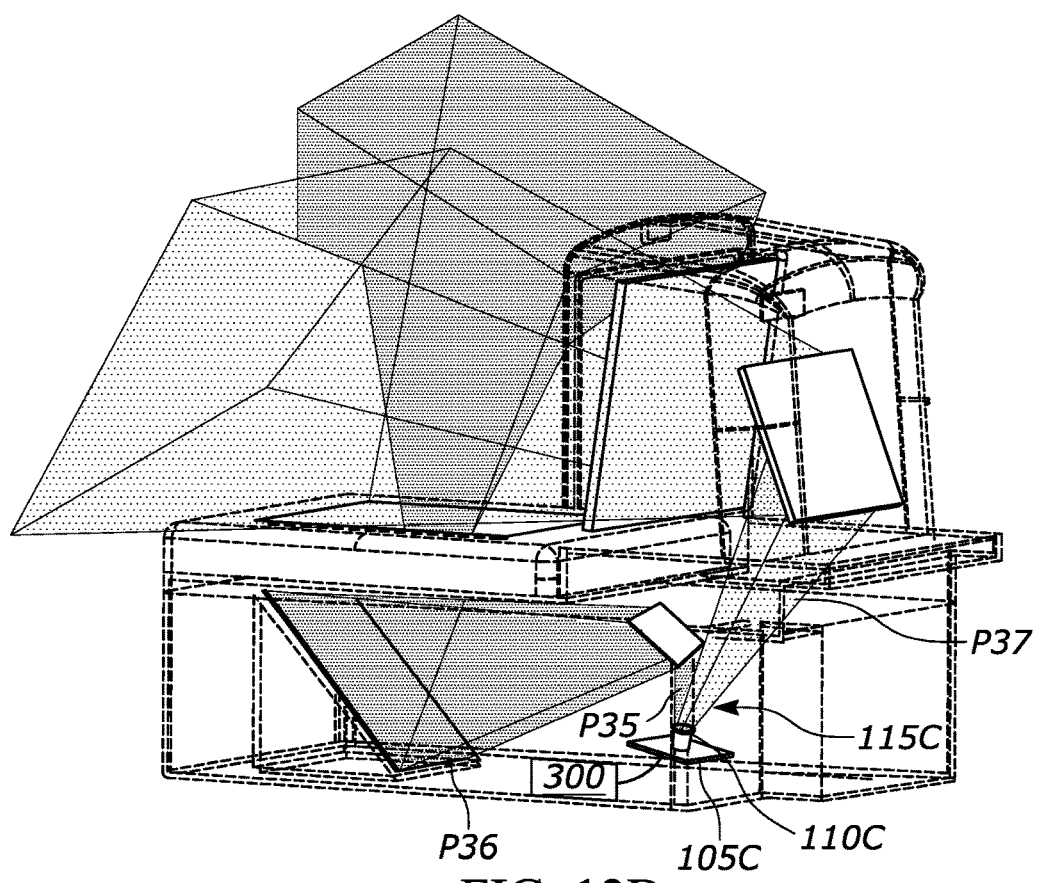
FIG. 12B illustrates the example bioptic barcode reader of FIG. 12A showing the various paths of the primary field-of-view of the imaging assembly.

Referring to FIGS. 12A and 12B, bioptic barcode reader 10 of FIG. 1 is illustrated with a fourth example imaging assembly 100C and a tenth example set of optical components 1200 positioned within interior region 25 of housing 20 and a decode module 300 communicatively coupled to imaging assembly 100C and configured to decode a barcode captured in an image by imaging assembly 100C. Imaging assembly 100C includes a printed circuit board 105C with a single image sensor 110C and has a primary field-of-view 115C. Printed circuit board 105C is aligned at an acute angle to upper surface 35 and printed circuit board 105C and image sensor 110C are arranged to direct primary field-of-view 115C at the acute angle to upper surface 35 and towards upper housing portion 45. In this example, bioptic barcode reader 10 does not have any other imaging assembly communicatively coupled to decode module 300 and used to process images for decoding indicia, other than imaging assembly 100C, which reduces the number of components and allows bioptic barcode reader 10 to be smaller and be manufactured less expensively than traditional bioptic barcode readers.

Optical components 1200 are configured to divide primary field-of-view 115C and include a mirror arrangement 1205 with a splitter mirror 1210, a first mirror 1215, and a second mirror 1220. Splitter mirror 1210 is positioned directly in a first path P35 of a first portion of primary field-of-view 115C and is configured to split primary field-of-view 115C along a horizontal axis and redirect the first portion of primary field-of-view 115C from first path P35 to a second path P36 towards first mirror 1215. Splitter mirror 1210 can be positioned to split primary field-of-view 115C in any proportion desired. For example, primary field-of-view 115C can be split such that the first and second portions of primary field-of-view 115C are equal, the first portion is 0-25% larger than the second portion, or the second portion is 0-25% larger than the first portion, depending on the configuration and desired use of bioptic barcode reader 10. Second mirror 1220 is positioned directly in a third path P37 of the second portion of primary field-of-view 115C and is configured to redirect the second portion through generally upright window 50. The second portion of primary field-of-view 115C that is redirected from second mirror 1220 through generally upright window 50 can fill 50-100% of generally upright window 50 and, preferably, an area of the second portion of primary field-of-view 115C redirected through generally upright window 50, taken along a plane of generally upright window 50, is greater than an area of generally upright window 50 such that generally upright window 50 crops or reduces the second portion of primary field-of-view 115C and allows only a portion of the second portion to pass through. First mirror 1215 is positioned directly in a second path P36 of a first portion of primary field-of-view 115C and is configured to redirect the first portion through generally horizontal window 40. The first portion of primary field-of-view 115C that is redirected from first mirror 1215 through generally horizontal window 40 can fill 50-100% of generally horizontal window 40 and, preferably, an area of the first portion of primary field-of-view 115C redirected through generally horizontal window 40, taken along a plane of generally horizontal window 40, is greater than an area of generally horizontal window 40 such that generally horizontal window 40 crops or reduces the first portion of primary field-of-view 115C and allows only a portion of the first portion to pass through. For example, width W3 of generally horizontal window 40 could be greater than length L2 of generally horizontal window 40 such that a width of the first portion of primary field-of-view 115C allowed to pass through generally horizontal window 40 is greater than a length of the first portion of primary field-of-view 115C allowed to pass through generally horizontal window 40. In this example, mirror arrangement 1205 does not have any other mirrors, other than splitter mirror 1210, first mirror 1215, and second mirror 1220, which also reduces the number of components and allows bioptic barcode reader 10 to be smaller and be manufactured less expensively than traditional bioptic barcode readers.

Figure 13A:
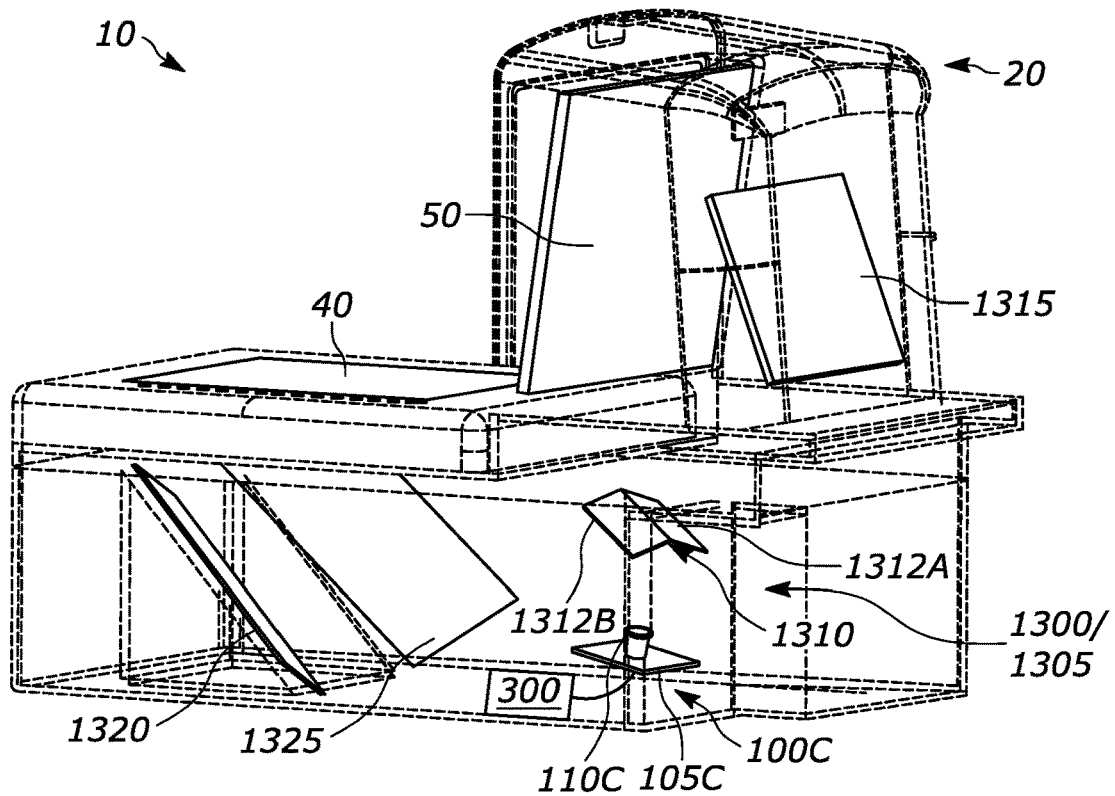
FIG. 13A illustrates the example bioptic barcode reader of FIG. 1 with an eleventh example imaging assembly and set of optical components.
Figure 13B:
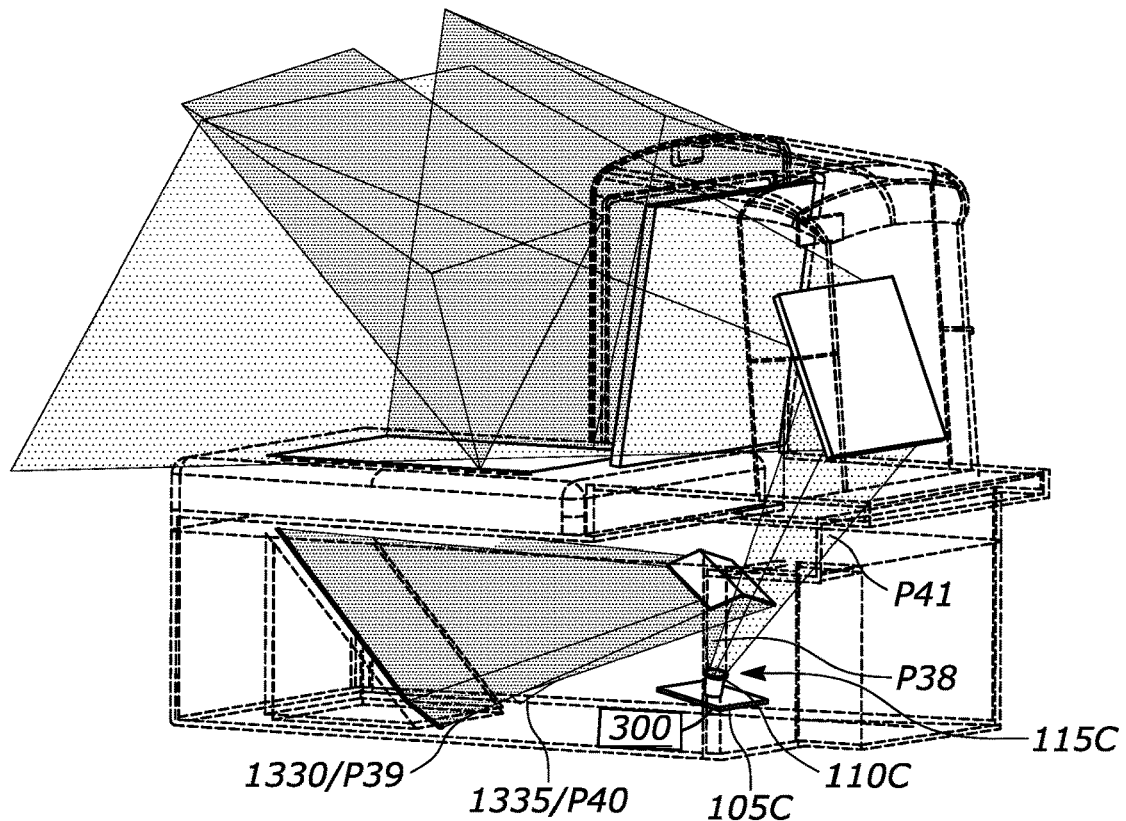
FIG. 13B illustrates the example bioptic barcode reader of FIG. 13A showing the various paths of the primary field-of-view of the imaging assembly.

Referring to FIGS. 13A and 13B, bioptic barcode reader 10 of FIG. 1 is illustrated with fourth example imaging assembly 100C described above and an eleventh example set of optical components 1300 positioned within interior region 25 of housing 20 and decode module 300 communicatively coupled to imaging assembly 100C and configured to decode a barcode captured in an image by imaging assembly 100C. In this example, bioptic barcode reader 10 again does not have any other imaging assembly communicatively coupled to decode module 300 and used to process images for decoding indicia, other than imaging assembly 100C, which reduces the number of components and allows bioptic barcode reader 10 to be smaller and be manufactured less expensively than traditional bioptic barcode readers.

Optical components 1300 are configured to divide primary field-of-view 115C and include a mirror arrangement 1305 with a splitter mirror 1310, a first mirror 1315, a second mirror 1320, and a third mirror 1325. Splitter mirror 1310 is positioned directly in a first path P38 of a first portion of primary field-of-view 115C and is configured to split primary field-of-view 115C along a horizontal axis, split the first portion of primary field-of-view 115C into a first subfield 1330 and a second subfield 1335, redirect first subfield 1330 from first path P38 to a second path P39 towards second mirror 1320, and redirect second subfield 1335 from first path P38 to a third path P40 towards third mirror 1325. In this example, splitter mirror 1310 is a concave splitter mirror having first and second planar mirrors 1312A, 1312B that are arranged such that second path P39 from first planar mirror 1312A and third path P40 from second planar mirror 1312B cross. Having splitter mirror 1310 in a concave configuration increases the internal path length between image sensor 110C and generally horizontal window 40, which allows for better barcode reading range and minimizes field-of-view twist, which enables more usable field-of-view through generally horizontal window 40. Alternatively, splitter mirror 1310 could be a convex splitter mirror that is arranged such that second path P39 from first planar mirror 1312A and third path P40 from second planar mirror 1312B diverge. Splitter mirror 1310 can be positioned to split primary field-of-view 115C in any proportion desired. For example, primary field-of-view 115C can be split such that the first and second portions of primary field-of-view 115C are equal, the first portion is 0-25% larger than the second portion, or the second portion is 0-25% larger than the first portion, depending on the configuration and desired use of bioptic barcode reader 10.

Second mirror 1320 is positioned directly in second path P39 and is configured to redirect first subfield 1330 redirected from splitter mirror 1310 through generally horizontal window 40 and third mirror 1325 is positioned direct in third path P40 and is configured to redirect second subfield 1335 redirected from splitter mirror 1310 through generally horizontal window 40. First subfield 1330 redirected from second mirror 1320 through generally horizontal window 40 and second subfield 1335 redirected from third mirror 1325 through generally horizontal window 40 together can fill 50-100% of generally horizontal window 40. First mirror 1315 is positioned directly in a fourth path P41 of a second portion of primary field-of-view 115C and is configured to redirect the second portion through generally upright window 50. The second portion of primary field-of-view 115C that is redirected from first mirror 1315 through generally upright window 50 can fill 50-100% of generally upright window 50 and, preferably, an area of the second portion of primary field-of-view 115C redirected through generally upright window 50, taken along a plane of generally upright window 50, is greater than an area of generally upright window 50 such that generally upright window 50 crops or reduces the second portion of primary field-of-view 115C and allows only a portion of the second portion to pass through. For example, width W2 of generally upright window 50 could be greater than length/height H3 of generally upright window 50 such that a width of the second portion of primary field-of-view 115C allowed to pass through generally upright window 50 is greater than a length of the second portion of primary field-of-view 115C allowed to pass through generally upright window 50. In this example, mirror arrangement 1305 does not have any other mirrors, other than splitter mirror 1310, first mirror 1315, second mirror 1320, and third mirror 1325, which also reduces the number of components and allows bioptic barcode reader 10 to be smaller and be manufactured less expensively than traditional bioptic barcode readers.

Figure 14A:
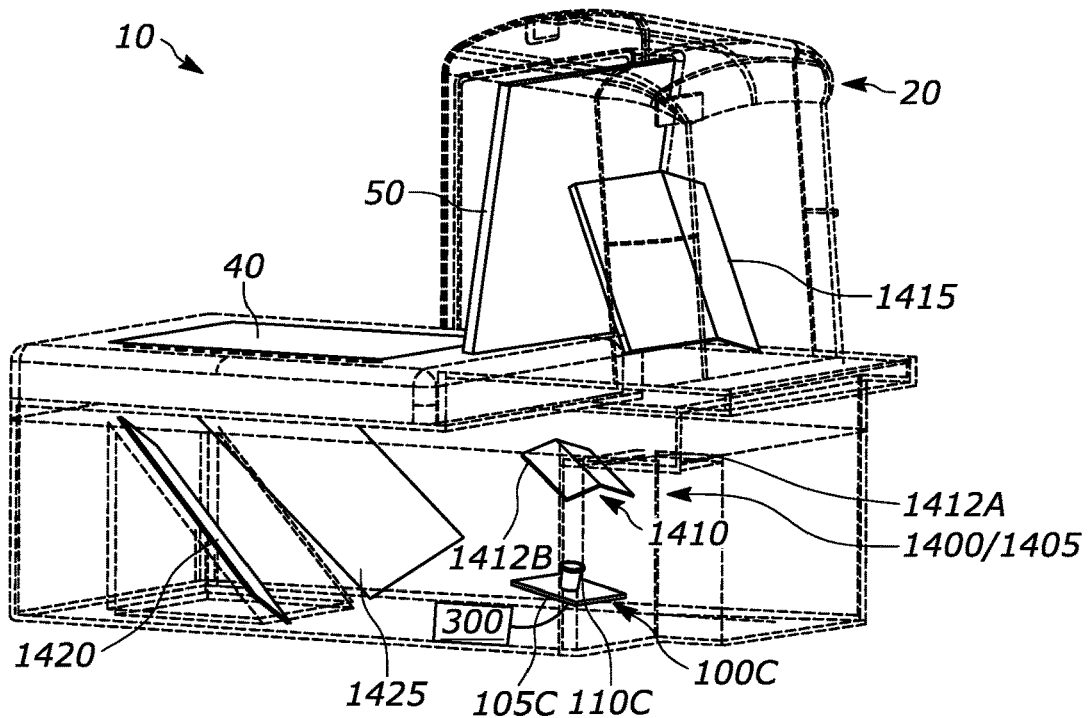
FIG. 14A illustrates the example bioptic barcode reader of FIG. 1 with a twelfth example imaging assembly and set of optical components.
Figure 14B:
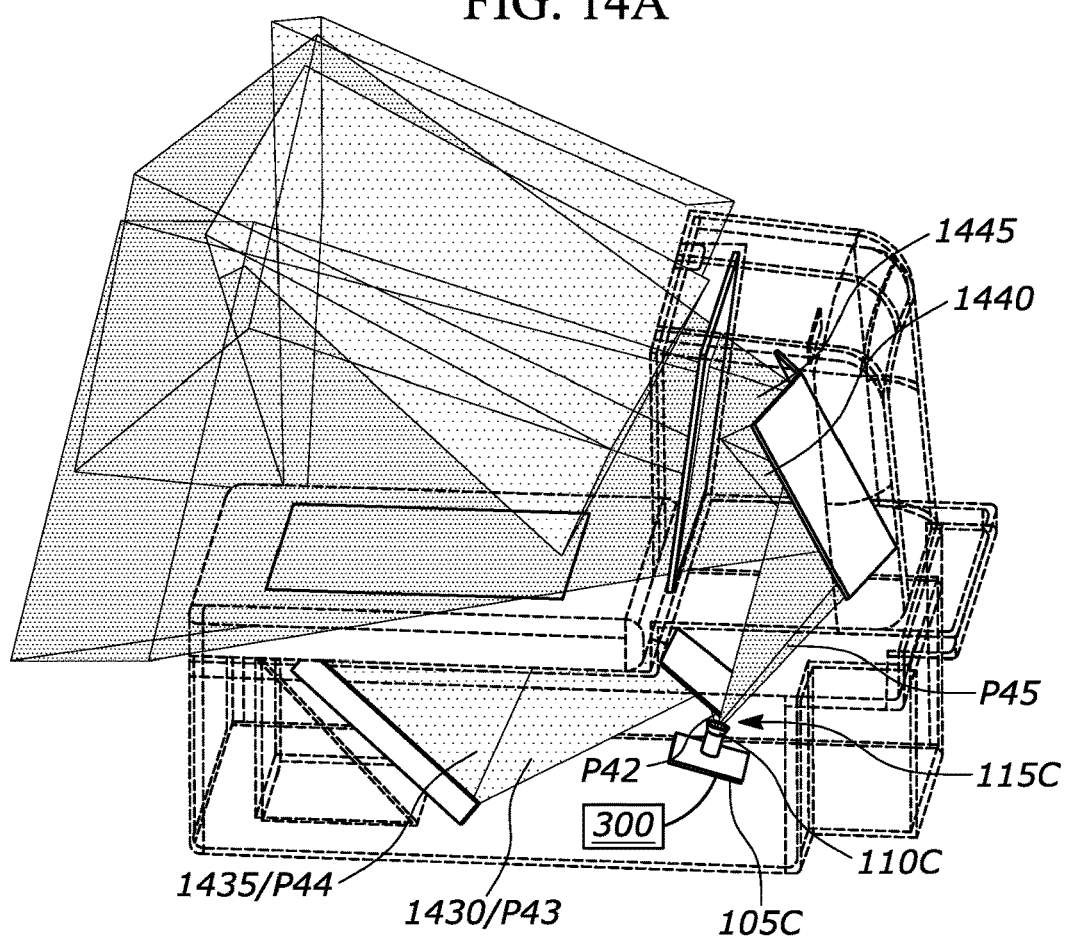
FIG. 14B illustrates the example bioptic barcode reader of FIG. 14A showing the various paths of the primary field-of-view of the imaging assembly.

Referring to FIGS. 14A and 14B, bioptic barcode reader 10 of FIG. 1 is illustrated with fourth example imaging assembly 100C described above and a twelfth example set of optical components 1400 positioned within interior region 25 of housing 20 and decode module 300 communicatively coupled to imaging assembly 100C and configured to decode a barcode captured in an image by imaging assembly 100C. In this example, bioptic barcode reader 10 again does not have any other imaging assembly communicatively coupled to decode module 300 and used to process images for decoding indicia, other than imaging assembly 100C, which reduces the number of components and allows bioptic barcode reader 10 to be smaller and be manufactured less expensively than traditional bioptic barcode readers.

Optical components 1400 are configured to divide primary field-of-view 115C and include a mirror arrangement 1405 with a splitter mirror 1410, a first mirror 1415, a second mirror 1420, and a third mirror 1425. Splitter mirror 1410 is positioned directly in a first path P42 of a first portion of primary field-of-view 115C and is configured to split primary field-of-view 115C along a horizontal axis, split the first portion of primary field-of-view 115C into a first subfield 1430 and a second subfield 1435, redirect first subfield 1430 from first path P42 to a second path P43 towards second mirror 1420, and redirect second subfield 1435 from first path P42 to a third path P44 towards third mirror 1425. In this example, splitter mirror 1410 is a concave splitter mirror having first and second planar mirrors 1412A, 1412B that are arranged such that second path P43 from first planar mirror 1412A and third path P44 from second planar mirror 1412B cross. Having splitter mirror 1410 in a concave configuration increases the internal path length between image sensor 110C and generally horizontal window 40, which allows for better barcode reading range and minimizes field-of-view twist, which enables more usable field-of-view through generally horizontal window 40. Alternatively, splitter mirror 1410 could be a convex splitter mirror that is arranged such that second path P43 from first planar mirror 1412A and third path P44 from second planar mirror 1412B diverge. Splitter mirror 1410 can be positioned to split primary field-of-view 115C in any proportion desired. For example, primary field-of-view 115C can be split such that the first and second portions of primary field-of-view 115C are equal, the first portion is 0-25% larger than the second portion, or the second portion is 0-25% larger than the first portion, depending on the configuration and desired use of bioptic barcode reader 10.

Second mirror 1420 is positioned directly in second path P43 and is configured to redirect first subfield 1430 redirected from splitter mirror 1410 through generally horizontal window 40 and third mirror 1425 is positioned direct in third path P44 and is configured to redirect second subfield 1435 redirected from splitter mirror 1410 through generally horizontal window 40. First subfield 1430 redirected from second mirror 1420 through generally horizontal window 40 and second subfield 1435 redirected from third mirror 1425 through generally horizontal window 40 together can fill 50-100% of generally horizontal window 40. First mirror 1415 is positioned directly in a fourth path P45 of a second portion of primary field-of-view 115C and is configured to redirect the second portion through generally upright window 50. In this example, first mirror 1415 is a concave splitter mirror and is configured to split the second portion of primary field-of-view 115C into a third subfield 1440 and a fourth subfield 1445, redirect third subfield 1440 through generally upright window 50, and redirect fourth subfield 1445 through generally upright window 50. Third subfield 1440 and fourth subfield 1445 together can fill 50-100% of generally upright window 50. In this example, mirror arrangement 1405 does not have any other mirrors, other than splitter mirror 1410, first mirror 1415, second mirror 1420, and third mirror 1425, which also reduces the number of components and allows bioptic barcode reader 10 to be smaller and be manufactured less expensively than traditional bioptic barcode readers.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The legal scope of the property right is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s).

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A bioptic barcode reader having a product scanning region, the bioptic barcode reader comprising:
 a housing having a lower housing portion with an upper surface facing the product scanning region and an upper housing portion extending above the lower housing portion;
 an imaging assembly having a primary field-of-view;
 a generally horizontal window positioned at the upper surface of the lower housing portion, the generally horizontal window configured to allow a first light to pass between the product scanning region and an interior region of the housing;
 a generally upright window positioned in the upper housing portion, the generally upright window configured to allow a second light to pass between the product scanning region and the interior region of the housing; and
 a set of optical components positioned within the interior region of the housing and configured to divide the primary field-of-view of the imaging assembly; wherein
 the housing has a width that is greater than or equal to 5 inches and less than or equal to 7 inches;

the lower housing portion has a height that is greater than or equal to 3 inches;
the upper housing portion has a height that is greater than or equal to 4 inches and less than or equal to 6 inches; and
the upper surface of the lower housing portion has a length between a proximal edge adjacent the upper housing portion to a distal edge, opposite the proximal edge, that is greater than or equal to 6 inches and less than or equal to 8 inches.

2. The bioptic barcode reader of claim 1, wherein the generally upright window has a height that is greater than or equal to 3½ inches and less than or equal to 6 inches and a width that is greater than or equal to 4 inches and less than or equal to 7 inches.

3. The bioptic barcode reader of claim 1, wherein the generally horizontal window has a width that is greater than or equal to 3½ inches and less than or equal to 6 inches and the upper surface of the lower housing portion has a width that is greater than or equal to 5 inches and less than or equal to 7 inches.

4. The bioptic barcode reader of claim 3, wherein the generally horizontal window has a length that is greater than or equal to 3½ inches and less than or equal to 6 inches.

5. The bioptic barcode reader of claim 1, wherein:
the upper surface has a proximal edge adjacent the upper portion and a distal edge opposite the proximal edge;
the imaging assembly includes a printed circuit board with a single image sensor, the printed circuit board aligned generally perpendicular to the upper surface and the printed circuit board and the image sensor arranged to direct the primary field-of-view generally parallel to the upper surface and towards the distal edge of the upper surface;
the bioptic barcode reader includes a decode module communicatively coupled to the imaging assembly and configured to decode a barcode captured in an image by the imaging assembly;
the set of optical components includes a mirror arrangement positioned within the interior region, the mirror arrangement including a splitter mirror, a first mirror, and a second mirror;
the splitter mirror is positioned directly in a first path of a first portion of the primary field-of-view and is configured to split the primary field-of-view along a horizontal axis and redirect the first portion of the primary field-of-view from the first path to a second path towards the second mirror;
the first mirror is positioned directly in a third path of a second portion of the primary field-of-view and is configured to redirect the second portion through the generally horizontal window;
the second mirror is positioned directly in the second path and is configured to redirect the first portion through the generally upright window; and
the bioptic barcode reader has no other imaging assembly communicatively coupled to the decode module and used to process images for decoding indicia.

6. The bioptic barcode reader of claim 5, wherein the mirror arrangement has no other mirrors.

7. The bioptic barcode reader of claim 1, wherein:
the upper surface has a proximal edge adjacent the upper portion and a distal edge opposite the proximal edge;
the imaging assembly includes a printed circuit board with a single image sensor, the printed circuit board aligned generally perpendicular to the upper surface and the printed circuit board and the image sensor arranged to direct the primary field-of-view generally parallel to the upper surface and towards the distal edge of the upper surface;
the bioptic barcode reader includes a decode module communicatively coupled to the imaging assembly and configured to decode a barcode captured in an image by the imaging assembly;
the set of optical components includes a mirror arrangement positioned within the interior region, the mirror arrangement including a splitter mirror, a first mirror, a second mirror, and a third mirror;
the splitter mirror is positioned directly in a first path of a first portion of the primary field-of-view and is configured to: split the primary field-of-view along a horizontal axis; split the first portion of the primary field-of-view into a first subfield and a second subfield; redirect the first subfield along second path towards the second mirror; and redirect the second subfield along a third path towards the third mirror;
the first mirror is positioned directly in a fourth path of a second portion of the primary field-of-view and is configured to redirect the second portion through the generally horizontal window;
the second mirror is positioned directly in the second path and is configured to redirect the first subfield through the generally upright window;
the third mirror is positioned directly in the third path and is configured to redirect the second subfield through the generally upright window; and
the bioptic barcode reader has no other imaging assembly communicatively coupled to the decode module and used to process images for decoding indicia.

8. The bioptic barcode reader of claim 7, wherein the splitter mirror is a concave splitter mirror having two planar mirrors and the second path and the third path cross.

9. The bioptic barcode reader of claim 8, wherein the first mirror is a concave splitter mirror and is configured to: split the second portion of the primary field-of-view into a third subfield and a fourth subfield; redirect the third subfield through the generally horizontal window; and redirect the fourth subfield through the generally horizontal window.

10. The bioptic barcode reader of claim 7, wherein the splitter mirror is a convex splitter mirror having two planar mirrors and the second path and the third path diverge.

11. The bioptic barcode reader of claim 10, wherein the first mirror is a concave splitter mirror and is configured to: split the second portion of the primary field-of-view into a third subfield and a fourth subfield; redirect the third subfield through the generally horizontal window; and redirect the fourth subfield through the generally horizontal window.

12. The bioptic barcode reader of claim 7, wherein the mirror arrangement has no other mirrors.

13. The bioptic barcode reader of claim 1, wherein:
the upper surface has a proximal edge adjacent the upper portion and a distal edge opposite the proximal edge;
the imaging assembly includes a printed circuit board with a single image sensor, the printed circuit board aligned generally horizontal to the upper surface and the printed circuit board and the image sensor arranged to direct the primary field-of-view generally perpendicular to the upper surface and towards the upper housing portion;
the bioptic barcode reader includes a decode module communicatively coupled to the imaging assembly and configured to decode a barcode captured in an image by the imaging assembly;

the set of optical components includes a mirror arrangement positioned within the interior region, the mirror arrangement including a splitter mirror, a first mirror, and a second mirror;

the splitter mirror is positioned directly in a first path of a first portion of the primary field-of-view and is configured to split the primary field-of-view along a horizontal axis and redirect the first portion of the primary field-of-view from the first path to a second path towards the first mirror;

the second mirror is positioned directly in a third path of a second portion of the primary field-of-view and is configured to redirect the second portion through the generally upright window;

the first mirror is positioned directly in the second path and is configured to redirect the first portion through the generally horizontal window; and the bioptic barcode reader has no other imaging assembly communicatively coupled to the decode module and used to process images for decoding indicia.

14. The bioptic barcode reader of claim 13, wherein the mirror arrangement has no other mirrors.

15. The bioptic barcode reader of claim 1, wherein:
the upper surface has a proximal edge adjacent the upper portion and a distal edge opposite the proximal edge;
the imaging assembly includes a printed circuit board with a single image sensor, the printed circuit board aligned generally horizontal to the upper surface and the printed circuit board and the image sensor arranged to direct the primary field-of-view generally perpendicular to the upper surface and towards the upper housing portion;
the bioptic barcode reader includes a decode module communicatively coupled to the imaging assembly and configured to decode a barcode captured in an image by the imaging assembly;
the set of optical components includes a mirror arrangement positioned within the interior region, the mirror arrangement including a splitter mirror, a first mirror, a second mirror, and a third mirror;
the splitter mirror is positioned directly in a first path of a first portion of the primary field-of-view and is configured to: split the primary field-of-view along a horizontal axis; split the first portion of the primary field-of-view into a first subfield and a second subfield; redirect the first subfield along a second path towards the second mirror; and redirect the second subfield along a third path towards the third mirror;
the first mirror is positioned directly in a fourth path of a second portion of the primary field-of-view and is configured to redirect the second portion through the generally upright window;
the second mirror is positioned directly in the second path and is configured to redirect the first subfield through the generally horizontal window;
the third mirror is positioned directly in the third path and is configured to redirect the second subfield through the generally horizontal window; and
the bioptic barcode reader has no other imaging assembly communicatively coupled to the decode module and used to process images for decoding indicia.

16. The bioptic barcode reader of claim 15, wherein the mirror arrangement has no other mirrors.

17. The bioptic barcode reader of claim 1, wherein:
the upper surface having a proximal edge adjacent the upper portion and a distal edge opposite the proximal edge;
the imaging assembly includes a printed circuit board with a single image sensor, the printed circuit board aligned generally perpendicular to the upper surface and the printed circuit board and the image sensor arranged to direct the primary field-of-view generally parallel to the proximal edge of the upper surface;
the bioptic barcode reader includes a decode module communicatively coupled to the imaging assembly and configured to decode a barcode captured in an image by the imaging assembly;
the set of optical components includes a mirror arrangement positioned within the interior region, the mirror arrangement including a splitter mirror, a first mirror, a second mirror, and a third mirror;
the splitter mirror is positioned directly in a first path of a first portion of the primary field-of-view and is configured to split the primary field-of-view along a vertical axis and redirect the first portion of the primary field-of-view from the first path to a second path towards the third mirror;
the first mirror is positioned directly in a third path of a second portion of the primary field-of-view and is configured to redirect the second portion from the third path to a fourth path towards the second mirror;
the second mirror is positioned directly in the fourth path and is configured to redirect the second portion through the generally upright window;
the third mirror is positioned directly in the second path and is configured to redirect the first portion through the generally horizontal window; and
the bioptic barcode reader has no other imaging assembly communicatively coupled to the decode module and used to process images for decoding indicia.

18. The bioptic barcode reader of claim 17, wherein the mirror arrangement has no other mirrors.

19. The bioptic barcode reader of claim 1, wherein:
the upper surface has a proximal edge adjacent the upper portion and a distal edge opposite the proximal edge;
the imaging assembly includes a printed circuit board with a single image sensor, the printed circuit board aligned at an acute angle to the upper surface and the printed circuit board and the image sensor arranged to direct the primary field-of-view at the acute angle to the upper surface and towards the upper housing portion;
the bioptic barcode reader includes a decode module communicatively coupled to the imaging assembly and configured to decode a barcode captured in an image by the imaging assembly;
the set of optical components includes a mirror arrangement positioned within the interior region, the mirror arrangement including a splitter mirror, a first mirror, and a second mirror;
the splitter mirror is positioned directly in a first path of a first portion of the primary field-of-view and is configured to split the primary field-of-view along a horizontal axis and redirect the first portion of the primary field-of-view from the first path to a second path towards the first mirror;
the second mirror is positioned directly in a third path of a second portion of the primary field-of-view and is configured to redirect the second portion through the generally upright window;
the first mirror is positioned directly in the second path and is configured to redirect the first portion through the generally horizontal window; and the bioptic barcode reader has no other imaging assembly communicatively coupled to the decode module and used to process images for decoding indicia.

20. The bioptic barcode reader of claim 19, wherein the mirror arrangement has no other mirrors.

21. The bioptic barcode reader of claim 1, wherein:
the upper surface has a proximal edge adjacent the upper portion and a distal edge opposite the proximal edge;
the imaging assembly includes a printed circuit board with a single image sensor, the printed circuit board aligned at an acute angle to the upper surface and the printed circuit board and the image sensor arranged to direct the primary field-of-view at the acute angle to the upper surface and towards the upper housing portion;
the bioptic barcode reader includes a decode module communicatively coupled to the imaging assembly and configured to decode a barcode captured in an image by the imaging assembly;
the set of optical components includes a mirror arrangement positioned within the interior region, the mirror arrangement including a splitter mirror, a first mirror, a second mirror, and a third mirror;
the splitter mirror is positioned directly in a first path of a first portion of the primary field-of-view and is configured to: split the primary field-of-view along a horizontal axis; split the first portion of the primary field-of-view into a first subfield and a second subfield; redirect the first subfield along a second path towards the second mirror; and redirect the second subfield along a third path towards the third mirror;
the first mirror is positioned directly in a fourth path of a second portion of the primary field-of-view and is configured to redirect the second portion through the generally upright window;
the second mirror is positioned directly in the second path and is configured to redirect the first subfield through the generally horizontal window;
the third mirror is positioned directly in the third path and is configured to redirect the second subfield through the generally horizontal window; and
the bioptic barcode reader has no other imaging assembly communicatively coupled to the decode module and used to process images for decoding indicia.

22. The bioptic barcode reader of claim 21, wherein the splitter mirror is a concave splitter mirror having two planar mirrors and the second path and the third path cross.

* * * * *